US012777197B2

(12) United States Patent
Dupont et al.

(10) Patent No.: US 12,777,197 B2
(45) Date of Patent: Oct. 27, 2026

(54) OUT-OF-LOOP FILTERING WITH VIDEO-SPECIFIC MACHINE-LEARNED MODEL

(71) Applicant: GDM Holding LLC, Mountain View, CA (US)

(72) Inventors: Emilien Dupont, London (GB); Matthias Stephan Bauer, London (GB); Lucas Marvin Theis, London (GB); Hyun Jik Kim, London (GB); David Paul Etienne Heurtel-Depeiges, Montréal (CA); Dariusz Lasecki, Zürich (CH); Iryna Korshunova, London (GB)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 19/060,212

(22) Filed: Feb. 21, 2025

(65) Prior Publication Data

US 2026/0255001 A1 Aug. 27, 2026

(51) Int. Cl.
*H04N 19/00* (2014.01)
*G06T 9/00* (2006.01)
*H04N 19/86* (2014.01)

(52) U.S. Cl.
CPC ............. *H04N 19/86* (2014.11); *G06T 9/002* (2013.01)

(58) Field of Classification Search
CPC ...................................................... H04N 19/00
See application file for complete search history.

(56) References Cited

U.S. PATENT DOCUMENTS 12,067,699 B2 8/2024 Takahashi et al.
12,126,667 B2 10/2024 Petrovic et al.
2025/0287015 A1* 9/2025 Athavale ................ H04N 19/42

FOREIGN PATENT DOCUMENTS

WO WO 2024/076865 A1 4/2024

OTHER PUBLICATIONS

Kim et al., "C3: High-performance and Low-complexity Neural Compression from a Single Image or Video", arXiv:2312.02753v1, Dec. 5, 2023, 40 pages.
Ronneberger et al., "U-Net: Convolutional Networks for Biomedical Image Segmentation", arXiv:1505.04597v1, May 18, 2015, 8 pages.

(Continued)

*Primary Examiner* — Maryam A Nasri
(74) *Attorney, Agent, or Firm* — DORITY & MANNING, P.A.

(57) ABSTRACT

A computing system can obtain a first video, a compressed video, and a decompressed video, the compressed video having been generated from the first video by application of a compression algorithm of a video codec, the decompressed video having been generated from the compressed video by application of a decompression algorithm of the video codec. The computing system can train, based at least in part on the decompressed video and the first video, a video-specific machine-learned model configured to mitigate compression artifacts of the decompressed video. The computing system can transmit, over a communication channel to a destination device, the compressed video and the video-specific machine-learned model.

20 Claims, 17 Drawing Sheets

(56) References Cited

OTHER PUBLICATIONS

Shi et al., "Real-Time Single Image and Video Super-Resolution Using an Efficient Sub-Pixel Convolutional Neural Network", arXiv:1609.05158v2, Sep. 23, 2016, 10 pages.
Bablani et al., "Efficient and Effective Methods for Mixed Precision Neural Network Quantization for Faster, Energy-efficient Inference", arXiv:2301, 13330, Jan. 30, 2023, 15 pages.
He et al., An Efficient Video Coding System With an Adaptive Overfitted Multi-Scale Attention Network, IEEE Access, vol. 9, Apr. 26, 2021, pp. 64022-64032.
International Search Report and Written Opinion for Application No. PCT/US2026/015474, mailed Jun. 17, 2026, 24 pages.
Li et al., "AHG8: Lightweight post-processing algorithm for machine consumption", 36th Meeting, Kerner, TR, Nov. 6, 2024, 5 pages.
Shen et al., "Q-BERT; Hessian Based Ultra Low Precision Quantization of BERT", arXiv:1909.05840v2, Sep. 25, 2019, 15 pages.

* cited by examiner

600

OUT-OF-LOOP FILTERING WITH VIDEO-SPECIFIC MACHINE-LEARNED MODEL

BACKGROUND

The present disclosure relates generally to machine learning processes and machine-learned devices and systems. A computer can receive input(s). The computer can execute instructions to process the input(s) to generate output(s) using a parameterized model. The computer can obtain feedback on its performance in generating the outputs with the model. The computer can generate feedback by evaluating its performance. The computer can receive feedback from an external source. The computer can update parameters of the model based on the feedback to improve its performance. In this manner, the computer can iteratively "learn" to generate the desired outputs. The resulting model is often referred to as a machine-learned model.

Data compression refers to techniques for representing data using a number of bits that is smaller than a number of bits of a first representation of the data being compressed. In some instances, a component for compressing and decompressing data (sometimes referred to as encoding and decoding) can be referred to as a codec. Data compression methods can include lossless compression methods, wherein a compressed representation contains sufficient data to exactly reconstruct the first representation, and lossy compression methods, wherein a compressed representation may not encode sufficient data to create an exact reconstruction. In some instances, a difference between a first data representation used to generate a compressed representation and a second data representation generated from the compressed representation can be referred to as a compression artifact.

SUMMARY

Aspects and advantages of embodiments of the present disclosure will be set forth in part in the following description, or can be learned from the description, or can be learned through practice of the embodiments.

Example aspects of the present disclosure provide an example method. In some implementations, the example method can include obtaining, by a computing system comprising one or more computing devices, a first video, a compressed video, and a decompressed video, the compressed video having been generated from the first video by application of a compression algorithm of a video codec, the decompressed video having been generated from the compressed video by application of a decompression algorithm of the video codec. The example method can include training, by the computing system based at least in part on the decompressed video and the first video, a video-specific machine-learned model configured to mitigate compression artifacts of the decompressed video. The example method can include transmitting, by the computing system over a communication channel to a destination device, the compressed video and the video-specific machine-learned model.

In the example method, a number of multiply-accumulate operations of the video-specific machine-learned model can be less than 10,000 multiply-accumulate operations per pixel.

In the example method, the video-specific machine-learned model can include a convolutional neural network having a number of multiply-accumulate operations that is less than 10,000 multiply-accumulate operations per pixel.

In the example method, a number of bits of the video-specific machine-learned model can be less than 10 percent of a number of bits of the compressed video.

In the example method, training the video-specific machine-learned model can include, for each of a plurality of training iterations, providing, by the computing system to the video-specific machine-learned model, data indicative of one or more frames of the decompressed video. In the example method, the one or more frames can be respectively associated with one or more corresponding original frames of the first video. In the example method, training the video-specific machine-learned model can include, for each of the plurality of training iterations, generating, by the video-specific machine-learned model based on the data indicative of the one or more frames of the decompressed video, one or more training outputs. In the example method, training the video-specific machine-learned model can include, for each of the plurality of training iterations, updating, by the computing system based on a comparison between the one or more training outputs and the one or more corresponding original frames, the video-specific machine-learned model.

In the example method, each frame of the one or more frames can include an N-dimensional luminance tensor having a first shape and one or more N-dimensional chrominance tensors having a second shape that is smaller than the first shape, wherein N is a positive integer. In the example method, training the video-specific machine-learned model can include transforming, by the computing system, the luminance tensor into a plurality of smaller luminance tensors. In the example method, training the video-specific machine-learned model can include providing, by the computing system to the video-specific machine-learned model, each frame of the one or more frames as an (N+1)-dimensional tensor comprising the plurality of smaller luminance tensors and the one or more chrominance tensors concatenated along the (N+1)th dimension.

In the example method, the smaller luminance tensors can have the second shape.

In the example method, the (N+1)-dimensional tensor can further include one or more positional embedding tensors having the second shape.

In the example method, updating the video-specific machine-learned model can include updating based on a loss function indicative of a weighted combination of a plurality of signal-to-noise ratios associated with a plurality of channels of the one or more frames. In the example method, a weight associated with a luminance channel of the plurality of channels can be greater than a weight associated with a first chrominance channel of the plurality of channels.

In the example method, the one or more frames can include at least one of: a plurality of temporally related frames, wherein the video-specific machine-learned model is configured to perform temporal convolutions; and a plurality of randomly sampled frames, wherein the video-specific machine-learned model does not perform temporal convolutions.

In the example method, training the video-specific machine-learned model can include quantizing, by the computing system, the video-specific machine-learned model.

In the example method, the video-specific machine-learned model can include a sequence of layers comprising an input layer, one or more intermediate layers, and an output layer. In the example method, training the video-specific machine-learned model can include quantizing one or both of the input layer and the output layer according to a first quantization step size. In the example method, training the video-specific machine-learned model can include quantizing at least one of the one or more intermediate layers according to a second quantization step size that is smaller than the first quantization step size.

In the example method, quantizing the video-specific machine-learned model can include, for each of a plurality of respective candidate quantization step sizes, quantizing, by the computing system, one or more parameters of the video-specific machine-learned model according to the respective candidate quantization step size to generate a candidate quantized machine-learned model. In the example method, quantizing the video-specific machine-learned model can include, for each of a plurality of respective candidate quantization step sizes, generating, by the candidate quantized machine-learned model based on the compressed video, a reconstructed video. In the example method, quantizing the video-specific machine-learned model can include, for each of a plurality of respective candidate quantization step sizes determining, by the computing system, a metric of video quality of the reconstructed video. In the example method, quantizing the video-specific machine-learned model can include selecting, by the computing system based on a rate-distortion tradeoff, a quantization step size of the plurality of respective candidate quantization step sizes.

The example method can include obtaining, by the computing system, a plurality of decompressed video segments that have been generated by segmenting, compressing, and decompressing a second video. The example method can include training, by the computing system based on the plurality of decompressed video segments, a plurality of respective segment-specific machine-learned models. In the example method, each respective segment-specific machine-learned model of the plurality of respective segment-specific machine-learned models can be configured to mitigate compression artifacts of a respective decompressed video segment of the plurality of decompressed video segments. The example method can include transmitting, by the computing system over a communication channel to a destination device, the plurality of respective segment-specific machine-learned models and compressed video data associated with the second video.

In the example method, obtaining the plurality of decompressed video segments can include segmenting based on one or more of: one or more detected boundaries between scenes of the second video; one or more detected boundaries between shots of the second video; and one or more metrics of change between frames or groups of frames of the second video.

In the example method, transmitting the compressed video and the video-specific machine-learned model can include packaging, by the computing system, the compressed video and the video-specific machine-learned model into a combined file package. In the example method, transmitting the compressed video and the video-specific machine-learned model can include transmitting, by the computing system, the combined file package to the destination device.

Example aspects of the present disclosure provide an example computing system that includes one or more processors and one or more example non-transitory computer-readable media storing instructions that are executable by one or more processors to cause a computing system to perform example operations. In some implementations, the example operations can include transmitting, over a communication channel to a destination device: a compressed video that has been generated by compressing a first video; and a video-specific machine-learned model. In the example operations, the video-specific machine-learned model can include a model that has been trained by: providing, to the video-specific machine-learned model at each of a plurality of training iterations, data indicative of one or more frames of a decompressed video that has been generated by decompressing the compressed video, wherein the one or more frames are respectively associated with one or more corresponding original frames of the first video; receiving, from the video-specific machine-learned model at each of the plurality of training iterations, one or more training outputs generated based on the data indicative of the one or more frames of the decompressed video; and updating, at each of the plurality of training iterations, based on a comparison between the one or more training outputs and the one or more corresponding original frames, the video-specific machine-learned model.

Example aspects of the present disclosure provide one or more example non-transitory computer-readable media storing instructions that are executable by one or more processors to cause a computing system to perform example operations. In some implementations, the example operations can include receiving, over a communication channel, a first compressed video and a video-specific machine-learned model associated with the first compressed video. The example operations can include decompressing the first compressed video using a video codec to generate a first decompressed video. The example operations can include providing, to the video-specific machine-learned model, one or more first frames of the first decompressed video. The example operations can include receiving, from the video-specific machine-learned model, one or more second frames generated based on the one or more first frames. The example operations can include displaying, to a user, the one or more second frames.

In the example operations, the video-specific machine-learned model can include a convolutional neural network having a number of multiply-accumulate operations that is less than 5,000 multiply-accumulate operations per pixel.

In the example operations, the video-specific machine-learned model can include one or more parameters that have been quantized according to one or more quantization step sizes.

Other example aspects of the present disclosure are directed to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in and constitute a part of this specification, illustrate implementations of the present disclosure and, together with the description, help explain the related principles.

DETAILED DESCRIPTION

Figure 1:
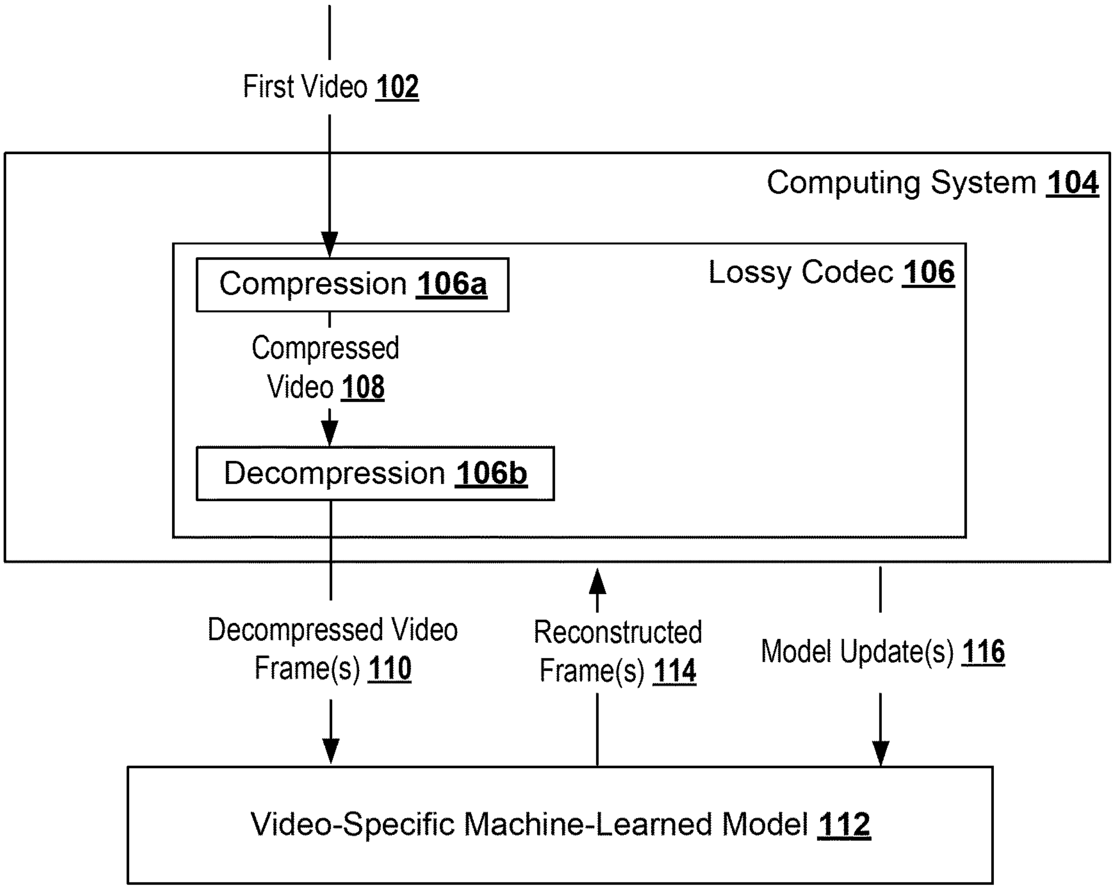
FIG. 1 is a block diagram of an example system for training a video-specific machine-learned model for out-of-loop filtering according to example implementations of aspects of the present disclosure.

Generally, the present disclosure is directed to video-specific machine-learned models configured to mitigate compression artifacts associated with a particular individual video. A computing system can obtain an uncompressed video. The computing system can compress the uncompressed video (e.g., using a lossy codec) to generate a compressed video. The computing system can decompress the compressed video (e.g., using a lossy codec used to generate the compressed video) to generate a decompressed video. The computing system can train, based on the decompressed video and the original uncompressed video, a video-specific machine-learned model configured to mitigate compression artifacts of the decompressed video. The computing system can transmit, over a communication channel to a destination device (e.g., client device such as smart phone, etc.), a data bundle comprising the compressed video and the video-specific machine-learned model. In some instances, the destination device can decompress the compressed video; provide decompressed frames of the decompressed video to the video-specific machine-learned model to generate filtered frames having improved visual quality compared to the decompressed frames; and display the filtered frames to a user.

In some instances, the video-specific machine-learned model can be very small, such as very small compared to one or more of a size of the compressed video, a number of pixels of the filtered frames, a computational resource budget of the destination device, or another point of comparison. For example, in some instances, a video-specific machine-learned model can have a size in bits that is significantly smaller than a size in bits of the compressed video, such as less than 10 percent (e.g., less than 5 percent, such as less than 2 percent, such as less than 1 percent, etc.) of the size in bits of the compressed video. As another example, in some instances, a video-specific machine-learned model can have less than 10,000 multiply-accumulate operations (MACs) per pixel of the filtered frames (e.g., less than 5,000, such as less than 2,000, such as less than 1,000, such as about 600 multiply-accumulate operations per pixel, etc.). As another example, in some instances, a video-specific machine-learned model can have a number of multiply-accumulate operations per second of decompressed video (e.g., $$\frac{MACs}{\text{pixel}} * \frac{\text{pixels}}{\text{frame}} * \frac{\text{frames}}{s},$$

etc.) that is less than a number of multiply-accumulate operations per second of a hardware resource budget (e.g., total maximum MACs per second, MACs per second allocated to a video streaming application, etc.) of a destination device. In this manner, for instance, a visual quality of filtered frames displayed to a user can be improved at a reduced computational cost compared to some alternative methods for improving a visual quality of compressed video (e.g., larger or more computationally expensive multi-video machine-learned model for out-of-loop filtering; higher-bitrate compression; etc.).

In some instances, each video-specific machine-learned model can be associated with a short video or video segment, such as a video segment that is less than about 20 seconds long (e.g., less than about 10 seconds, such as less than about 5 seconds, etc.). In some instances, a longer video (e.g., longer than about 2 seconds, such as longer than about 5 seconds, such as longer than about 10 seconds, etc.) can be segmented into a plurality of segments (e.g., based on a detected scene change, shot change, or other metric of change, etc.), and a separate segment-specific machine-learned model can be trained for each of the plurality of segments. The segment-specific machine-learned models can then be transmitted to a destination device along with compressed video data (e.g., compressed longer video, one or more compressed segments, etc.), and the destination device can decompress the video data and filter each respective segment of decompressed video data using a corresponding segment-specific machine-learned model.

In some instances, training a video-specific machine-learned model can include, for each of a plurality of training iterations: providing one or more decompressed video frames (e.g., plurality of consecutive frames or randomly sampled frames, etc.) to the video-specific machine-learned model; receiving, from the video-specific machine-learned model, one or more second frames generated based on the decompressed frames; and updating the video-specific machine-learned model based on a comparison between the second frame(s) and one or more corresponding uncompressed frames of the original video. For example, in some instances, updating can include updating based on a loss function comparing the second frame(s) and original frame(s), such as a weighted loss function indicative of a plurality of signal-to-noise ratios (SNRs) associated with a plurality of channels (e.g., luminance channel and chrominance channels, red-green-blue channels, cyan-magenta-yellow-black channels, etc.) of the second frame(s).

In some instances, training a video-specific machine-learned model can include quantizing one or more parameters of the video-specific machine-learned model (e.g., after a plurality of training iterations). In some instances, quantizing a parameter can include quantizing according to a quantization step size, such as by dividing the parameter by the quantization step size and rounding to a nearest integer to generate a quantized parameter indicative of an integer multiple of the quantization step size. In some instances, a plurality of quantization step sizes can be used, such as smaller step sizes for parameter(s) near an input or output layer of the video-specific machine-learned model, and larger step sizes for parameter(s) in one or more middle layers of the video-specific machine-learned model. In some instances, a plurality of candidate step sizes or candidate combinations of step sizes can be tested, and a set of quantization step size(s) can be selected based on the test results (e.g., based on a rate-distortion metric indicative of a tradeoff between a bitrate savings associated with the quantization step size and a corresponding reduction in visual quality associated with the quantization step size).

In some instances, a video-specific machine-learned model can include a convolutional neural network architecture, such as a convolutional neural network architecture having one or more contraction layers and one or more expansion layers (e.g., encoder-decoder convolutional neural network, very small U-Net convolutional neural network, etc.). In some instances, the video-specific machine-learned model can be configured to receive a decompressed frame in a three-dimensional tensor format, such as a tensor comprising one or more two-dimensional matrices of luminance values; one or more two-dimensional matrices of chrominance values; and one or more two-dimensional matrices of positional embedding values.

Example embodiments according to some aspects of the present disclosure can provide for a number of technical effects and benefits, such as improvements to computing technology (e.g., data compression technology, machine learning technology, etc.). For example, in some instances, systems and methods according to some aspects of the present disclosure can reduce a computational cost (e.g., communication cost in bits, etc.), of transmitting video data at a given visual quality compared to some alternative implementations. As another example, in some instances, systems and methods according to some aspects of the present disclosure can reduce a computational cost (e.g., processor usage cost such as multiply-accumulate operations per pixel, etc.) of out-of-loop filtering of decompressed video data compared to some alternative implementations. As another example, in some instances, systems and methods according to some aspects of the present disclosure can reduce a computational cost (e.g., memory footprint, etc.) of storing video data at a given visual quality compared to some alternative implementations. As another example, in some instances, systems and methods according to some aspects of the present disclosure can improve a visual quality of video data that has been transmitted or compressed according to a given bit rate or computational budget (e.g., communication budget in bits, storage footprint in bits, etc.).

In some instances, systems and methods according to some aspects of the present disclosure can reduce a computational cost (e.g., communication cost in bits, etc.), of transmitting video data at a given visual quality compared to some alternative implementations. For example, in some example experiments according to aspects of the present disclosure, a first plurality of videos decoded using video-specific machine-learned models according to some aspects of the present disclosure were compared to a second plurality of videos decoded using only a video codec, wherein each of the first and second plurality comprised videos at a plurality of different compression bit rates, and wherein all videos of the first and second plurality were generated from the same original video in each example experiment. In the example experiments, a peak signal-to-noise ratio was evaluated for each video of the first and second plurality of videos, and a Bjontegaard delta rate (BD rate) was computed based on the first and second pluralities of peak signal-to-noise ratios. In the example experiments, the BD rate reflected an average improvement of more than 10 percent for videos decoded using video-specific machine-learned models according to aspects of the present disclosure, even when the bit rate used to compute the BD rate included the bits required to store or transmit the video-specific machine-learned model (in addition to the bits required to store or transmit the compressed video). In some instances, significant BD rate improvements were seen using video-specific machine-learned models having very low computational cost, such as a greater than 10 percent improvement for video-specific machine-learned models having about 660 multiply-accumulate operations (MACs) per pixel.

Similarly, in some instances, systems and methods according to some aspects of the present disclosure can reduce a computational cost (e.g., memory footprint, etc.) of storing video data at a given visual quality compared to some alternative implementations. For example, in some instances, a number of bits required to transmit a compressed video and corresponding video-specific machine-learned model can be similar to (e.g., same as, etc.) a number of bits required to store the compressed video and corresponding video-specific machine-learned model. For at least this reason, systems and methods that can reduce a communication cost of transmitting compressed video data at a given visual quality according to some aspects of the present disclosure can also reduce a computational cost (e.g., memory footprint, storage footprint, etc.) of storing the compressed video data at the given visual quality.

In some instances, systems and methods according to some aspects of the present disclosure can reduce a computational cost (e.g., processor usage cost such as multiply-accumulate operations per pixel, etc.) of out-of-loop filtering of decompressed video data compared to some alternative implementations. For example, some alternative implementations of out-of-loop filtering may include using a multi-video or video-agnostic machine-learned model, such as a convolutional neural network having hundreds of thousands of MACs per pixel or more (e.g., millions, etc.). In contrast, systems and methods according to some aspects of the present disclosure can provide out-of-loop filtering using less than 10,000 MACs per pixel (e.g., about 660 MACs per pixel in some example experiments, etc.), thereby reducing a computational cost of out-of-loop filtering compared to some alternative implementations.

In some instances, systems and methods according to some aspects of the present disclosure can improve a visual quality of video data that has been transmitted or compressed according to a given bit rate or computational budget (e.g., communication budget in bits, storage footprint in bits, etc.). For example, in some instances, a visual quality of compressed video data can scale with a number of bits used to represent the compressed video data. In such instances, a visual quality of compressed video data can be increased by increasing a bit rate of the compressed video data. For at least this reason, systems and methods that can provide a reduced bit rate at a given visual quality can be adapted to provide an improved visual quality at a given bit rate (e.g., by increasing a bit rate used to compress the video data from the reduced bit rate to the original bit rate, etc.). Thus, systems and methods according to some aspects of the present disclosure can provide improved visual quality of decompressed video at a given bit rate compared to some alternative implementations.

As used herein, the terms "about" or "approximately" in conjunction with a numerical value refer to within 20 percent of the numerical value.

Various example implementations are described herein with respect to the accompanying Figures.

FIG. 1 is a block diagram of an example system for training a video-specific machine-learned model for out-of-loop filtering according to example implementations of aspects of the present disclosure. A computing system 104 can obtain a first video 102. The computing system 104 can compress the first video 102 using a lossy codec 106 to generate a compressed video 108. The computing system can decompress the compressed video 108 to generate decompressed video 110. Based on the decompressed video 110, the computing system 104 can train a video-specific machine-learned model 112 associated with the first video 102. Training the video-specific machine-learned model 112 can include, for each of a plurality of training iterations, providing one or more frames 110 of the decompressed video to the video-specific machine-learned model 112; receiving, from the video-specific machine-learned model 112, one or more reconstructed frames 114 generated from the decompressed video frames 110; and providing, to the video-specific machine-learned model 112 based at least in part on a comparison between the reconstructed frame(s) 114 and one or more corresponding uncompressed frames of the first video 102, one or more model updates 116.

A first video 102 can include, for example, video data represented in various formats. A first video 102 can include one type or many types of video data. In some instances, a first video 102 can include uncompressed video data that has not been processed by a lossy compression process (e.g., video that has been encoded and decoded in a lossless process, video that has never been compressed, video recently captured by a video capture device, etc.). In some instances, first video 102 can include streaming video data, video file data, or other data structure comprising video data. In some instances, a first video 102 can include a plurality of video frames, such as an ordered plurality of frames each associated with a respective time stamp (e.g., ordered set of frames to be displayed according to a frame rate, etc.). In some instances, each frame can include image data, such as image data comprising a plurality of pixels. In some instances, a first video 102 or frame thereof can include or be associated with other data, such as audio data (e.g., synchronized audio data configured to be output in conjunction with image data of one or more frames), text data or natural language data (e.g., subtitle data, etc.), or other data (e.g., metadata such as file type, video title, director name or other artist name, etc.). In some instances, a first video 102 can be represented as a plurality of bits, such as an ordered stream of bits; a file comprising an ordered plurality of bits; or the like.

In some instances, a first video 102 can include a relatively short video, such as a YouTube Short or similar-length video. In some instances, a first video 102 can include a video consisting of only one scene (e.g., scene comprising multiple shots that share a common location, subject matter, or other property) or only one "shot" (e.g., video having one camera shot such as a panning shot, tripod shot, or other shot; video without visual "cuts" between frames; animation or computer-generated video comprising one visual shot; etc.). In some instances, a first video 102 can include a video having a small number of frames or a video having a short time duration, such as a video that is less than about 1 minute long, such as less than about 30 seconds, such as less than about 20 seconds, such as less than about ten seconds, such as less than about 5 seconds, or the like; a video having a number of frames that is less than about 60 times a number of seconds described herein (e.g., 60, 30, 20, 10, or 5 seconds, etc.), such as less than 30 times the number of seconds, such as less than about 24 times the number of seconds; or the like. For example, in some instances, if a first video 102 has a size (e.g., number of scenes, number of shots, number of frames, number of seconds of time duration, number of bits or pixels, etc.) that is greater than a threshold size (e.g., one shot, one scene, 10 seconds, etc.), then the first video 102 can be segmented into a plurality of segments (e.g., based on a detected scene change, shot change, or other metric of change, etc.), and a separate segment-specific machine-learned model can be trained for each of the plurality of segments. The segment-specific machine-learned models can then be transmitted to a destination device along with compressed video data (e.g., compressed longer video, one or more compressed video segments, etc.), and the destination device can decompress the video data and filter each respective segment of decompressed video data using a corresponding segment-specific machine-learned model. Further details of an example system for segmenting first video 102 data and training a plurality of segment-specific machine-learned models are provided below with respect to FIGS. 4A-4B.

Although FIG. 1 depicts generating a video-specific machine-learned model 112 based on first video 102 data, similar methods can be applied to compression of non-video data types without deviating from the scope of the present disclosure. For example, in principle, any file comprising any data type (e.g., numerical machine-learned model parameter data, sequence data, etc.) can be compressed, decompressed, and used to train a file-specific machine-learned model to mitigate compression artifacts without deviating from the scope of the present disclosure.

A computing system 104 can be or include one or more software, firmware, or hardware components configured to train a video-specific machine-learned model 112 based on a first video 102. In some instances, the computing system 104 can be, comprise, be comprised by, or share one or more properties with a computing device or system described below with respect to FIGS. 15-17 (e.g., computing device 50, server computing system 60, model development platform system 70, computing device 98, computing device 99, etc.).

A lossy codec 106 can be or include one or more software, firmware, or hardware components configured to compress and decompress data, such as video data. Compression (e.g., data compression, source coding, bit-rate reduction, etc.) can include, for example, receiving a first data representation (e.g., first video 102, etc.) of first data, and generating a second data representation (e.g., compressed video 108, etc.) of the first data, wherein the second representation has a smaller size (e.g., fewer bits, etc.) than the first representation. In some instances, compression can include lossy compression, wherein the second data representation does not include sufficient data to fully reconstruct the first data representation. Decompression can include, for example, receiving the second data representation and generating, based on the second data representation, the first data representation or a third data representation of the first data. For example, in some instances, decompression of a second data representation generated using lossy compression can include generating a third data representation of the first data, wherein a size (e.g., bit rate per frame, bit rate per second of video, number of total bits, etc.) of the third data representation is larger than a size of the second data representation (e.g., a size that is the same as or smaller than a size of the first data representation, etc.).

In some instances, a lossy codec 106 can include a video codec such as H.264/MPEG-4 AVC, HEVC, VVC, VP9, AV1, AV2, or other video codec. In some instances, a lossy codec 106 can include video-specific component(s) specially configured to compress video data, general purpose component(s) configured to compress a variety of data types, or other component(s) configured to compress additional data associated with the first video 102 (e.g., component(s) for compressing an associated synchronized audio stream, metadata, or other associated data). In some instances, a lossy codec 106 can include a codec configured to substantially reduce a bitrate (e.g., number of bits per frame, number of bits per second of displayed video, etc.) of the first video 102, such as a codec configured to reduce a bit rate of 4K HD video to less than 100 Mbps, such as less than 50, such as less than 30, such as less than 20, such as less than 15, such as less than 10 Mbps.

In some instances, a lossy codec 106 can include one or more compression **106*a* components (e.g., compression algorithm, machine-learned compression component, entropy coding component, temporal compression component, spatial compression component, etc.). For example, in some instances, compression 106*a* can include spatial compression (e.g., intraframe compression, etc.), such as spatial compression representing a plurality of pixels (e.g., pixel region, etc.) having similar (e.g., same) values (e.g., chroma values, luma values, red/green/blue values, etc.) as a reduced-bit-size representation of a region of uniform color. As another example, in some instances, compression 106*a* can include temporal compression (e.g., interframe coding, etc.), such as temporal compression wherein a plurality of similar frames can be encoded based at least in part on a difference between related (e.g., consecutive, etc.) frames. In some instances, compression 106*a*** can include entropy coding.

In some instances, a lossy codec 106 can include one or more decompression **106*b* components (e.g., decompression algorithm, machine-learned decompression component, etc.), such as component(s) configured to receive a compressed video 108 and to generate decompressed video 110, such as decompressed video in a format configured to be displayed for a user or in another format. For example, in some instances, decompression 106*b* can include receiving a compressed video 108 in a compressed format, and determining, based on the compressed video 108**, a plurality of pixel values (e.g., red/green/blue pixel values, luma/chroma or YUV pixel values, cyan/magenta/yellow/black pixel values, etc.) for each of a plurality of pixels to be displayed to a user (e.g., using a display device such as television, computer monitor, touchscreen, etc.)

Compressed video 108 can include, for example, a compressed (e.g., lossily compressed, etc.) representation of the first video data 102, such as video data (e.g., frame data, etc.) depicting similar (e.g., same) content (e.g., video content; video frames; pixel content; entities or actions depicted or recorded in the first video 102, etc.) depicted in the first video data 102. In some instances, a compressed video 108 can have any property described herein with respect to a first video 102, and vice versa. For example, in some instances, compressed video 108 can include compressed representation(s) of one or more frames (e.g., image frames or video frames comprising one or more pixels, etc.), along with compressed or uncompressed representation(s) of associated data of other data types, such as synchronized audio data, metadata, or the like.

Decompressed video frame(s) 110 can include, for example, one or more frames of decompressed video data generated from a compressed video 108. In some instances, a decompressed video frame 110 can depict similar (e.g., same) content (e.g., video content; video frames; entities or actions depicted or recorded in the first video 102, etc.) as one or more corresponding frames of the first video data 102. In some instances, a decompressed video frame 110 can have any property described herein with respect to a first video 102 or frame thereof, and vice versa. In some instances, each decompressed video frame 110 can be associated with one frame or multiple frames of first video 102 data (e.g., one or more corresponding original frames of the first video 102, such as one or more original frames associated with a same timestamp or the like). For example, in some instances, decompressed video can include full-frame-rate decompressed video represented by one decompressed video frame 110 per frame of a first video 102 used to generate the decompressed video; reduced-frame-rate decompressed video represented by one decompressed video frame 110 for every N video frames of first video 102, where N can be a real number greater than 1; or other decompressed video data. In some instances, a decompressed video frame 110 can include pixel data indicative of a plurality of pixel values (e.g., YUV values, RGB values, CMYK values, etc.) associated with the frame, such as pixel data in a display format configured to be provided to a display device to display a plurality of pixels to a user according to the plurality of pixel values, or in another format.

In some instances, the decompressed video frame(s) 110 can include a plurality of frames sampled at each training iteration of a plurality of training iterations. For example, in some instances, a video-specific machine-learned model 112 can include a model that does not perform any temporal convolutions, and a plurality of decompressed video frames 110 can include a plurality of randomly sampled frames (e.g., eight randomly sampled frames per training iteration in some example experiments; 4, 16, 32, or another number of randomly sampled frames; etc.). As another example, in some instances, a video-specific machine-learned model 112 can include a model having one or more temporal convolution layers, and a plurality of decompressed video frames 110 can include a plurality of temporally related (e.g., consecutive, etc.) frames, such as eight consecutive frames according to some example experiments, or another number of temporally related frames (e.g., 5, 10, 20, 30, etc.).

A video-specific machine-learned model 112 can include various model architectures, such as various neural network model architectures. An example model architecture for a video-specific machine-learned model 112 can include a convolutional architecture having one or more convolutional layers. Convolutional layers can include, for example, spatial convolution layer(s) (e.g., two-dimensional spatial convolution layers, etc.); temporal convolution layers (e.g., one-dimensional temporal convolution layers, etc.); or other layer type. For example, in some instances, a video-specific machine-learned model 112 can include a plurality of two-dimensional spatial convolution layers, without any temporal convolution layers. As another example, in some instances, a video-specific machine-learned model 112 can include a plurality of two-dimensional spatial convolution layers and one or more one-dimensional temporal convolution layers.

In some instances, a video-specific machine-learned model 112 can have one or more contraction layers (e.g., pooling layers, etc.), such as convolutional layers configured to output a number of values (e.g., activation values, etc.) that is smaller than a number of input values received by the layer. In some instances, a video-specific machine-learned model 112 can include one or more expansion layers configured to output a number of values (e.g., activation values, pixel values, etc.) that is larger than a number of input values received by the expansion layer. For example, in some instances, a video-specific machine-learned model 112 can include an encoder-decoder machine-learned model (e.g., encoder-decoder convolutional neural network, etc.) comprising a plurality of contraction layers (e.g., encoder layers, etc.) collectively configured to generate a reduced-size (e.g., reduced dimensionality, reduced number of activation values, reduced size in bits, etc.) encoding of a larger-size input (e.g., decompressed video frame 110) and a plurality of expansion layers collectively configured to generate an increased-size representation of the reduced-size encoding, such as an increased-size decoding having a size that is similar to (e.g., same as, etc.) a size of the larger size input (e.g., decompressed video frame 110, etc.) to the contraction layer(s). In some instances, a video-specific machine-learned model 112 can have one or more properties (e.g., any property, etc.) of a U-Net architecture or other convolutional neural network architecture. In some instances, one or more layers of the video-specific machine-learned model 112 can each include one or more activation functions, such as Gaussian Error Linear Unit (GELU) activation functions, rectified linear unit (ReLU) activation functions, sigmoidal activation functions, or another activation function. In some instances, a lightweight or computationally inexpensive (e.g., reduced processor usage in FLOPs, etc.) activation function (e.g., ReLU, etc.) can be used to reduce a computational cost of inference compared to some alternative implementations. Other architectures (e.g., architectures comprising attention mechanisms, such as transformer architectures; structured state space model architectures; etc.) or layer types (e.g., self-attention layers instead of or in addition to convolutional layers, etc.) are possible without deviating from the scope of the present disclosure.

In some instances, the video-specific machine-learned model 112 can be configured to receive a decompressed frame in a three-dimensional tensor format, such as a tensor comprising one or more two-dimensional matrices of luminance values (e.g., luma values, relative luminance values, weighted sum of gamma-compressed or linear red/green/blue values, etc.); one or more two-dimensional matrices of chrominance values (e.g., UV values, blue minus luma, red minus luma, etc.); and one or more two-dimensional matrices of positional embedding values. Further details of an example three-dimensional tensor format according to some aspects of the present disclosure are provided below with respect to FIGS. 5A and 5B. In some instances, the video-specific machine-learned model 112 can be configured to output data (e.g., luminance values, chrominance values, red/green/blue values, pixel values, etc.) in a format that is similar to (e.g., same as) or different from a corresponding input format used to generate the data. In some instances, the video-specific machine-learned model 112 can be configured to output data in a format that is similar to (e.g., same as) or different from a format used by one or more display devices (e.g., three-channel format comprising three two-dimensional matrices, etc.).

In some instances, a video-specific machine-learned model 112 can include a very small machine-learned model, such as a machine-learned model (e.g., convolutional neural network, etc.) having a size (e.g., number of parameters, size in bits, number of multiply-accumulate operations per pixel, etc.) that is much smaller than some conventional convolutional neural networks (e.g., conventional neural network for processing similar-size video frame input(s), conventional non-video-specific neural network for processing data from a plurality of distinct videos, etc.). For example, in some instances, a video-specific machine-learned model 112 can have a size in bits that is smaller (e.g., much smaller, etc.) than a size in bits of the compressed video 108. For example, in some instances, a size in bits of the video-specific machine-learned model 112 can be less than 30 percent of a size in bits of the compressed video 108, such as less than about 20 percent, such as less than about 10 percent, such as less than about 5 percent, such as less than about 2 percent, such as less than about 1 percent. As another example, in some instances, a video-specific machine-learned model 112 can have a number of multiply-accumulate operations (MACs) that is less than 50,000 MACs per pixel of the compressed video 108, such as less than 20,000 MACs per pixel, such as less than about 10,000 MACs per pixel, such as less than about 5,000, such as less than about 3,000, such as less than about 2,000, such as less than about 1,000, such as less than about 600 MACs per pixel of the compressed video 108. In contrast, conventional machine-learned models (e.g., conventional convolutional neural networks, etc.) may in some instances have hundreds of thousands or millions of MACs per pixel, which may exceed a computational resource budget of some video processing (e.g., video streaming display, video playback, etc.) systems or methods, thereby rendering some conventional or alternative machine-learned models potentially suboptimal for some applications described herein.

As another example, in some instances, a video-specific machine-learned model can have a number of multiply-accumulate operations (e.g., per pixel; per second of decompressed video (e.g., $$\frac{MACs}{\text{pixel}} * \frac{\text{pixels}}{\text{frame}} * \frac{\text{frames}}{s},$$

etc.) that is less than a number of multiply-accumulate operations (e.g., per second, per pixel, etc.) of a hardware resource budget (e.g., total maximum MACs per second, MACs per second allocated to a video streaming application, etc.) of a destination device. In some instances, a computing system 104 can obtain data indicative of one or more hardware resource budgets comprising one or more computing cost thresholds (e.g., MACs-per-second thresholds, MACs-per-pixel thresholds, etc.), and can determine an architecture or architectural property (e.g., number of layers, layer type(s), layer size(s), activation function(s), etc.) for the video-specific machine-learned model 112 based on the computing cost threshold(s). For example, in some instances, a plurality of video-specific machine-learned models 112 can be trained based on a plurality of computing cost thresholds, and an appropriate respective video-specific machine-learned model 112 can be selected for transmission with compressed video 108 (e.g., as described below with respect to FIG. 2, etc.) based at least in part on a hardware resource budget of a destination device to which the compressed video 108 is being transmitted. Other implementations are possible.

In some instances, a video-specific machine-learned model 112 can include a model that has not been pretrained in any way. For example, in some instances, a video-specific machine-learned model 112 can include a model having a plurality of parameters that have been randomly initialized. In some instances, a video-specific machine-learned model 112 can include a model that has not been (e.g., has not been and will never be, etc.) trained using any data that is not derived from the first video 102.

A reconstructed frame 114 can include, for example, a training output of a video-specific machine-learned model 112. In some instances, a reconstructed frame 114 can have any property described herein with respect to a decompressed video frame 110. For example, in some instances, a reconstructed frame 114 can comprise a number or type of pixel values that is similar to (e.g., same as) a number or type of pixel values of a decompressed video frame 110; can include frame data depicting similar (e.g., same, etc.) content compared to a corresponding decompressed video frame 110 used to generated the reconstructed frame 114; or the like. For example, in some instances, a video-specific machine-learned model 112 can include a symmetric encoder-decoder architecture configured to receive a first plurality of pixel values and generate, based on the first plurality, a second plurality of pixel values having a similar (e.g., same) number, format, dimension, or the like compared to the first plurality.

A model update 116 can include, for example, a value (e.g., numerical value, etc.) for updating one or more parameters of the video-specific machine-learned model 112, an action for updating the video-specific machine-learned model 112, or the like. For example, in some instances, a model update 116 value can include a numerical adjustment value to be combined with (e.g., added to, multiplied by, etc.) a parameter of the video-specific machine-learned model 112 to generate an updated parameter. In some instances, a model update 116 can be determined based on an evaluation of a training output (e.g., reconstructed frame 114, etc.), such as evaluation using a loss function, reward function, or other objective function. For example, in some instances, a reconstructed frame 114 can be compared to a ground truth output according to a loss function. For example, in some instances, a ground truth value can include a corresponding first video 102 frame associated with the decompressed video frame 110 used to generate the reconstructed frame 114. In some instances, an objective function can include one or more metrics of difference between the reconstructed frame 114 and a ground truth value (e.g., first video 102 frame, etc.). A metric of difference can include, for example, a raw numerical difference metric (e.g., peak signal-to-noise ratio, absolute pixel difference, etc.), a perceptual distortion metric indicative of an impact of a difference between the reconstructed frame 114 and a first video 102 frame on perceived visual quality (e.g., based on a model of human vision, etc.), or other difference metric. For example, in some instances, a metric of difference can include a weighted metric based on a plurality of peak signal-to-noise ratios, such as a metric that applies a first weight (e.g., 6, etc.) to a luma channel of the reconstructed frame 114 and a second, lower weight (e.g., 1, etc.) to each of one or more (e.g., two, etc.) chroma channels of the reconstructed frame 114. Other objective functions are possible.

In some instances, a gradient of an objective function with respect to one or more training outputs (e.g., mini-batch comprising a plurality of loss values associated with a plurality of reconstructed frames 114, etc.) can be determined, and the model updates 116 can be determined based on one or more gradients (e.g., by multiplying the gradient by a constant or adaptive learning rate parameter, etc.). Further details of some example methods for updating a machine-learned model are provided below, such as with respect to FIGS. 8 and 13.

For example, in some example experiments according to some aspects of the present disclosure, some example video-specific machine-learned models 112 were trained using an adaptive moment estimation (Adam) optimizer with a cosine decay learning rate schedule. However, this is not required, and other optimizers or learning rate schedules can be used. In some instances, a video-specific machine-learned model 112 can be trained for a plurality of training steps (e.g., Adam training steps, etc.), such as between about 1,000 and 100,000 iterations, such as between about 5,000 and 50,000, such as between about 10,000 and 40,000. For example, in some example experiments according to aspects of the present disclosure, good results were achieved with about 10,000 training steps. As another example, in some example experiments, diminishing returns were encountered beyond about 40,000 training steps.

Figure 2:
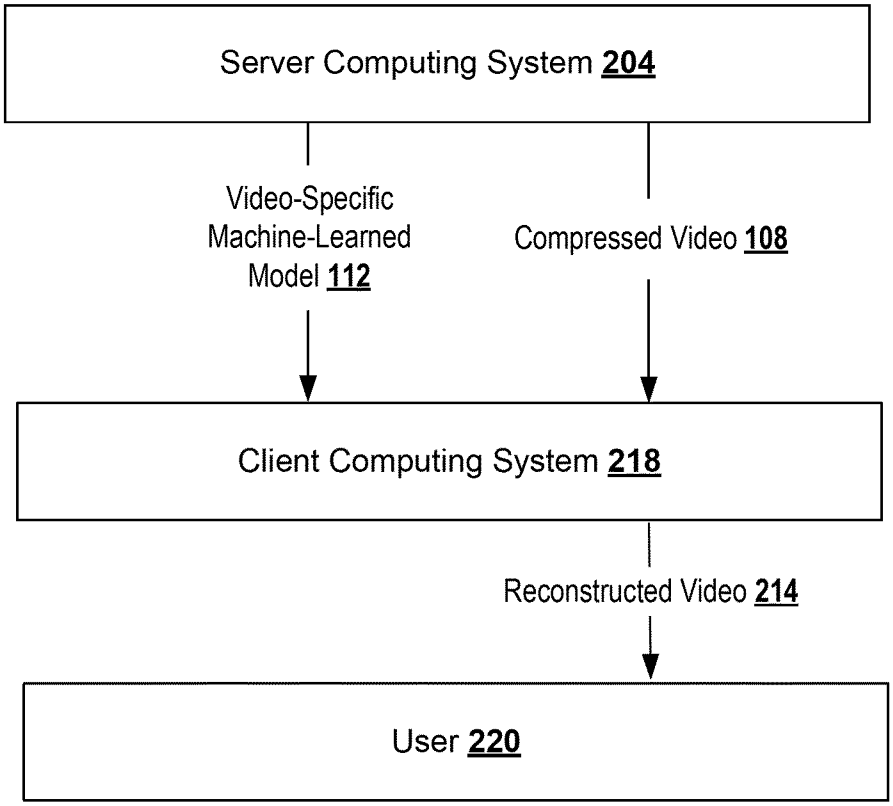
FIG. 2 is a block diagram of an example system for transmitting compressed video over a communication channel according to example implementations of aspects of the present disclosure.

FIG. 2 is a block diagram of an example system for transmitting compressed video over a communication channel according to example implementations of aspects of the present disclosure. A server computing system 204 can transmit, to a client computing system 218 over a communication channel (e.g., network such as the internet), a compressed video 108 and a video-specific machine-learned model 112 that has been trained based on the compressed video 108 (e.g., trained using decompressed video frame(s) 110 generated from the compressed video 108; trained according to methods described herein with respect to FIG. 1, etc.). The client computing system 218 can decompress the compressed video 108 (e.g., using a codec 106, etc.) to generate decompressed video. The client computing system 218 can generate, using the video-specific machine-learned model 112 and the decompressed video, one or more frames of reconstructed video 214 data. In some instances, the client computing system 218 can display the reconstructed video 214 to a user 220.

In some instances, a server computing system 204 can be, comprise, be comprised by, or otherwise share one or more properties with a computing system 104. For example, in some instances, a server computing system 204 can have any property described herein with respect to a computing system 104, and vice versa. In some instances, a server computing system 204 can have any property described below with respect to FIG. 15 and a server computing system 60. In some instances, a server computing system 204 can include a computing system configured to transmit video data (e.g., compressed video 108 data, video-specific machine-learned models 112, etc.) to a plurality of client devices, such as client computing systems 218. In some instances, a server computing system 204 can include a computing system or computing device that is the same as or different from a system or device used to train one or more video-specific machine-learned models 112. For example, in some instances, a first device or first plurality of devices can train a video-specific machine-learned model 112 and provide the model 112 to a second device or plurality of devices or to a storage system (e.g., database such as distributed database, file system such as distributed file system, etc.) accessible to the second device(s), and the second device(s) can transmit the model 112 and compressed video 208 to one or more client computing systems 218. Other implementations are possible.

In some instances, a server computing system 204 can transmit the compressed video 108 and video-specific machine-learned model 112 separately (e.g., as separate files, data streams, etc.) or together (e.g., as one file, one data stream, etc.). For example, a server computing system 204 can package the compressed video 108 and video-specific machine-learned model 112 into a combined file package (e.g., bundle, file container, combined data stream comprising the video-specific machine-learned model 112 and the compressed video 108, etc.), and can transmit the combined file package to a client computing system 218. As another example, in some instances, a server computing system 204 can transmit the video-specific machine-learned model 112 at a first time, and can transmit the compressed video 108 at a second time (e.g., immediately after transmission of the video-specific machine-learned model 112 to enable the client computing device to immediately convert compressed video 108 into reconstructed video 214, etc.). Other implementations are possible.

In some instances, reconstructed video 214 can be, comprise, be comprised by, or otherwise share one or more properties with reconstructed video 114. For example, in some instances, reconstructed video 214 can have any property described herein with respect to reconstructed video 114, and vice versa. In some instances, reconstructed video 214 can include an inference output generated by a fully trained video-specific machine-learned model 112 (in contrast, for example, to a reconstructed video 114 comprising a training output of a potentially untrained video-specific machine-learned model 112). In some instances, reconstructed video 214 can include data that is in the same format or a different format compared to reconstructed video 114, compressed video 108, decompressed video frame(s) 110, first video 102, or other format. For example, in some instances, a client computing system 218 can receive, over a communication channel (e.g., network such as the internet, etc.) compressed video 108 and a corresponding video-specific machine-learned model 112; decompress (e.g., using a decompression **106*b* algorithm of a lossy codec 106, etc.) the compressed video 108 to generate decompressed video; provide the decompressed video to the video-specific machine-learned model 112 to generate first reconstructed video 214 in a first format output by the video-specific machine-learned model 112 (e.g., three-dimensional tensor as described below with respect to FIGS. 5A-5B, etc.); and provide second reconstructed video 214 to a display device (e.g., for display to a user 220**) in the first format or in a second format (e.g., YUV format, RGB format, etc.) associated with the display device.

A client computing system 218 can be or include one or more software, firmware, or hardware components configured to receive compressed video 108 and a corresponding video-specific machine-learned model 112, and to generate reconstructed video 214 based on the compressed video 108 using the received video-specific machine-learned model 112. In some instances, the computing system 104 can be, comprise, be comprised by, or share one or more properties with a computing device or system described below with respect to FIGS. 15-17 (e.g., computing device 50, computing device 98, computing device 99, etc.). In some instances, a client computing system 218 can include a client device (e.g., smart phone, laptop, tablet, desktop, smart television, video streaming device such as Chromecast or Google TV Streamer, etc.) configured to display video content to a user 220.

Figure 3:
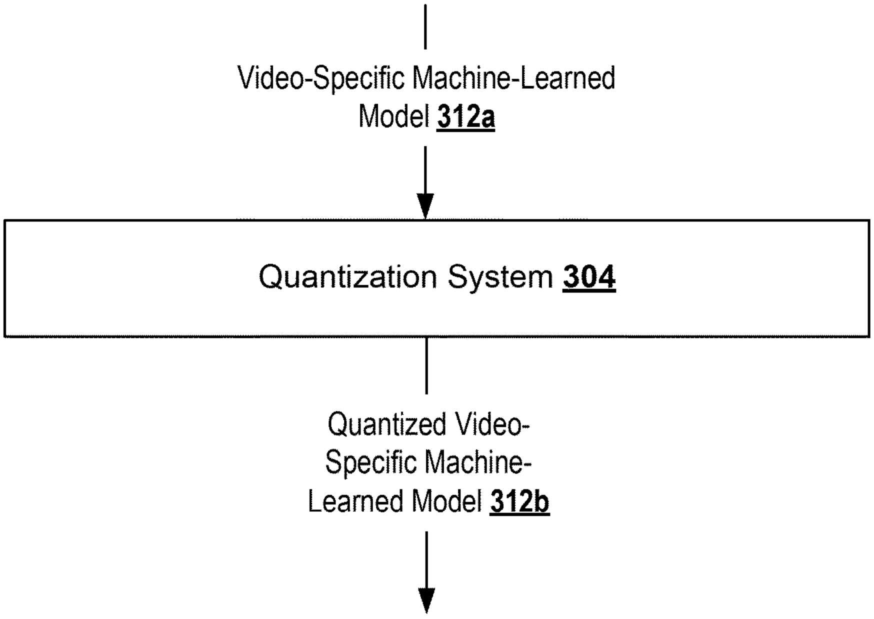
FIG. 3 is a block diagram of an example system for quantizing a video-specific machine-learned model according to example implementations of aspects of the present disclosure.

FIG. 3 is a block diagram of an example system for quantizing a video-specific machine-learned model according to example implementations of aspects of the present disclosure. A quantization system 304 can obtain a video-specific machine-learned model **312*a* that has been trained using one or more decompressed video frames (e.g., according to methods described above with respect to FIG. 1, etc.). The quantization system 304 can quantize the video-specific machine-learned model 312*a* to generate a quantized video-specific machine-learned model 312*b***.

In some instances, a quantization system 304 can be, comprise, be comprised by, or otherwise share one or more properties with a computing system 104. For example, in some instances, a quantization system 304 can have any property described herein with respect to a computing system 104, and vice versa. In some instances, a quantization system 304 can include one or more devices that are the same as or different from a device used to train the video-specific machine-learned model **312*a* (e.g., according to methods described herein with respect to FIG. 1**, etc.).

In some instances, a video-specific machine-learned model **312*a* or quantized video-specific machine-learned model 312*b* can be, comprise, be comprised by, or otherwise share one or more properties with a video-specific machine-learned model 112. For example, in some instances, a video-specific machine-learned model 312*a* or quantized video-specific machine-learned model 312*b* can have any property described herein with respect to a video-specific machine-learned model 112, and vice versa. For example, in some instances, a video-specific machine-learned model 312*a* can include a video-specific machine-learned model 112 that has been trained according to one or more methods described herein with respect to FIG. 1. As another example, in some instances, a video-specific machine-learned model 112 that is transmitted according to method(s) described herein with respect to FIG. 2 can include a quantized video-specific machine-learned model 312*b***.

In some instances, a quantized video-specific machine-learned model 312*b* can include a model having one or more quantized parameters configured to represent a corresponding parameter value of the video-specific machine-learned model 312*a* in fewer bits than a number of bits used in the video-specific machine-learned model 312*a* to represent the parameter. As a non-limiting illustrative example, a video-specific machine-learned model 312*a* can include a machine-learned model having one or more full-precision parameters represented in a full-precision format (e.g., 32-bit floating-point, etc.), and a video-specific machine-learned model 312*b* can include one or more reduced-precision parameters representing the same parameter values in a reduced-precision format (e.g., 16-bit floating-point, 8-bit floating-point or integer, 4-bit, or other reduced-precision format).

In some instances, quantizing a video-specific machine-learned model 312*a* to generate a quantized video-specific machine-learned model 312*b* can include scaling one or more parameters of the video-specific machine-learned model 312*a* according to a scaling factor. Scaling can include, for example, multiplying or dividing each of the one or more parameters by the scaling factor. For example, in some instances, scaling can include dividing a first parameter of the video-specific machine-learned model 312*a* by a quantization step size. In some instances, quantization can include or not include offsetting a parameter value (e.g., scaled parameter value, unscaled parameter value, etc.) according to an offset value. Offsetting can include, for example, adding or subtracting the offset value to or from a scaled parameter value.

In some instances, quantization can include rounding a resulting value (e.g., scaled value; scaled and offset value; etc.) to a nearest integer or nearest whole-bit value to generate a quantized parameter value, such as a quantized parameter value indicative of an integer multiple of a quantization step size. For example, in some instances, quantizing a parameter can include quantizing according to a quantization step size, such as by dividing the parameter by the quantization step size and rounding to a nearest integer to generate a quantized parameter indicative of an integer multiple of the quantization step size. In some instances, quantization can include identifying a first range of unquantized parameter values; identifying a second range of quantized values to represent the range of unquantized parameter values; and determining one or more scaling or offset values based on the first range and second range. As a non-limiting illustrative example, a scaling value can be equal to a ratio of a first range size of the first range (e.g., difference between minimum and maximum unquantized parameter values, etc.) and a second range size of the second range (e.g., difference between minimum and maximum quantized representation values, etc.); and an offset value can be equal to a difference between a canonical value (e.g., minimum value, maximum value, mean or median value, etc.) of the first range and a corresponding scaled canonical value (e.g., scaled minimum value, etc.) of the second range.

In some instances, quantization can include entropy coding (e.g., Huffman coding, arithmetic coding, Golomb coding, etc.) of one or parameters (e.g., quantized parameters such as scaled, offset, or rounded parameters, etc.) or groups of parameters (e.g., layers, groups of layers, etc.). In some instances, entropy coding can include entropy coding based on a probability distribution associated with a plurality of parameters, such as a Laplace distribution (e.g., double exponential distribution, etc.) or other distribution (e.g., Gaussian, etc.). In some instances, entropy coding can include losslessly compressing a plurality of parameters based at least in part on a measure of entropy, such as Shannon entropy or the like. In some instances, entropy coding can include converting a plurality of parameters to a representation configured to minimize or nearly minimize a total size or expected total size (e.g., total size in bits, code length, etc.) of the plurality of parameters (e.g., expected size given a probability distribution such as a Laplace distribution, etc.).

In some instances, quantization can include quantizing a plurality of parameters using one set of quantization hyperparameters (e.g., scaling factor(s), offset value(s), quantization step size(s), etc.) or multiple sets of quantization hyperparameters. For example, in some instances, a video-specific machine-learned model 312*a* can include a plurality of layers, and one or more first layer(s) can be quantized according to a first set of quantization hyperparameter(s) (e.g., first quantization step size, etc.) that is different from a second set of quantization hyperparameter(s) (e.g., second quantization step size, etc.) used to quantize one or more second layer(s) of the video-specific machine-learned model 312*a*. For example, in some instances, a video-specific machine-learned model 312*a* can include an ordered sequence of layers comprising one or more input layers; one or more (e.g., a plurality of) hidden layers (e.g., intermediate layers, etc.); and one or more output layers. In some instances, a quantization step size used to quantize an input or output layer can be smaller than a quantization step size used to quantize one or more hidden layers of the video-specific machine-learned model 312*a*. Similarly, in some instances, a precision used to represent an input or output layer of a quantized video-specific machine-learned model 312*b* can be higher than a precision used to represent one or more hidden layers of the quantized video-specific machine-learned model 312*b*. For example, in some instances, layer(s) near (e.g., at; sequentially near in an ordered sequence of layers, such as less than a threshold number of layers away; etc.) an input or output layer can be quantized according to a first quantization step size, and layer(s) further away from the input and output layers (e.g., layer(s) near a center of an ordered sequence of layers, etc.) can be quantized according to a second quantization step size that is larger than the first quantization step size. For example, in some example experiments according to some aspects of the present disclosure, quantization of middle layer(s) led to a smaller reduction in one or more metrics of visual quality (e.g., peak signal-to-noise ratio, etc.) compared to quantization of layer(s) near an input or output layer, and quantizing middle layers using a larger quantization step size compared to layer(s) near the input or output layers led to greater improvements in one or more metrics of rate-distortion tradeoff (e.g., Bjontegaard delta rate, etc.) compared to some alternative implementations.

In some instances, a plurality of candidate step sizes or candidate combinations of step sizes can be tested, and a set of quantization step size(s) can be selected based on the test results. For example, in some instances, a computing system can, for each of a plurality of respective candidate quantization step sizes (e.g., candidate sets of quantization step sizes; candidate quantization step sizes for a particular layer or layers; etc.), quantize one or more parameters (e.g., one or more layers, etc.) of the video-specific machine-learned model 312*a* according to the respective candidate quantization step size to generate a candidate quantized video-specific machine-learned model 312*b*; generate, using the candidate quantized machine-learned model 312*b*, a reconstructed video 114 based on decompressed video 110 used to train the video-specific machine-learned model 312*a*; and determine one or more of: a number of bits required to transmit the candidate quantized video-specific machine-learned model 312*b*; a metric of video quality of the reconstructed video 114; and a rate-distortion tradeoff associated with the number of bits required to transmit the candidate quantized video-specific machine-learned model 312*b* and the metric of video quality. In some instances, the quantization system 304 can select, based on a plurality of video quality metric values (e.g., based on a plurality of rate-distortion tradeoff values indicative of a tradeoff between a bitrate savings associated with the candidate quantized machine-learned model 312*b* and a corresponding reduction in visual quality associated with the candidate quantized machine-learned model 312*b*, etc.), one or more quantized video-specific machine-learned models 312*b* (e.g., one model; a plurality of model(s) based on a plurality of computational resource budget thresholds; etc.) from the plurality of candidate quantized video-specific machine-learned models 312*b*.

Figure 4A:
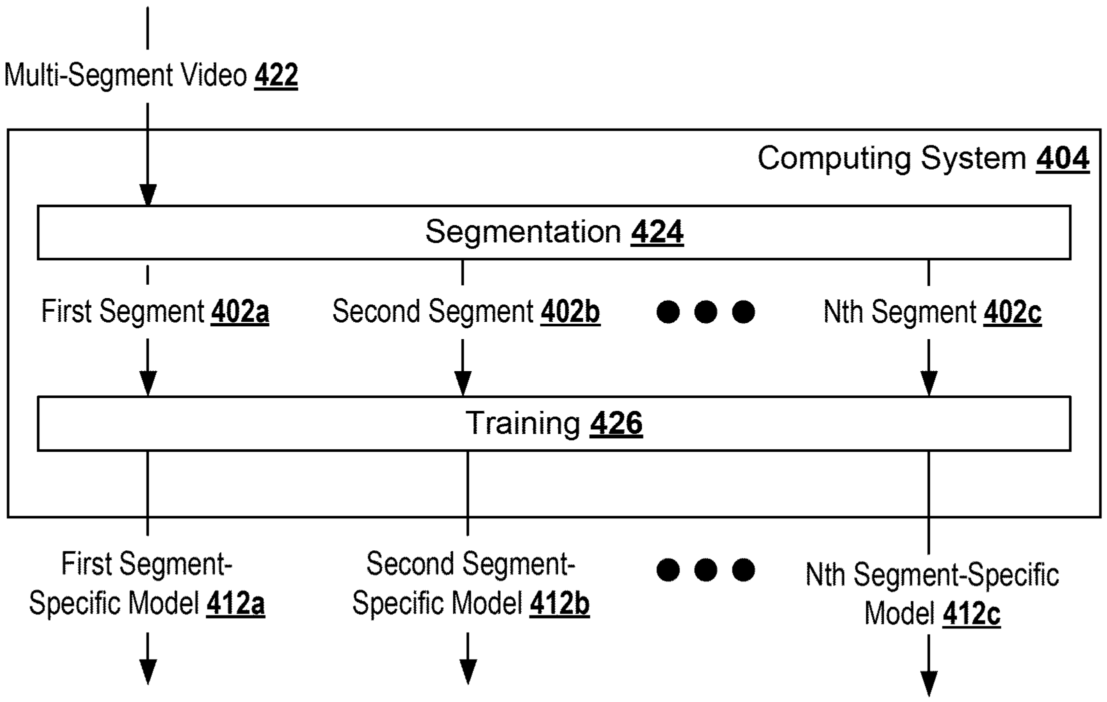
FIG. 4A is a block diagram of an example system for training a plurality of video-segment-specific machine-learned models for out-of-loop filtering according to example implementations of aspects of the present disclosure.

FIG. 4A is a block diagram of an example system for training a plurality of video-segment-specific machine-learned models for out-of-loop filtering according to example implementations of aspects of the present disclosure. A computing system 404 can obtain (e.g., receive, retrieve, generate, etc.) a multi-segment video 422, such as a video that is more than about 10 seconds long; a video comprising more than one scene or more than one shot; or other video configured to be split into segments. The computing system 404 can perform a segmentation 424 operation to generate a plurality of video segments 402 based on the multi-segment video 422. For each respective video segment 402*a*, 402*b*, 402*c* of the plurality of video segments 402, the computing system 404 can perform a training 426 operation based on the respective video segment 402 to generate a respective segment-specific machine-learned model 412*a*, 412*b*, 412*c*.

In some instances, a segment 402, computing system 404, or segment-specific machine-learned model 412 can be, comprise, be comprised by, or otherwise share one or more properties with a first video 102, computing system 104, or video-specific machine-learned model 112, respectively. For example, in some instances, a segment 402, computing system 404, or segment-specific machine-learned model 412 can have any property described herein with respect to a first video 102, computing system 104, or video-specific machine-learned model 112, respectively.

In some instances, a computing system 404 can train a first segment-specific machine-learned model 412*a* using a first segment 402*a* (e.g., as described herein with respect to FIG. 1, wherein the first video 102 is the first segment 402*a*, etc.); train a second segment-specific machine-learned model 412*b* using a second segment 402*b* (e.g., as described herein with respect to FIG. 1, wherein the first video 102 is the second segment 402*b*, etc.); train an Nth segment-specific machine-learned model 412*c* using an Nth segment 402*c* (e.g., as described herein with respect to FIG. 1, wherein the first video 102 is the Nth segment 402*c*, etc.); and so on.

In some instances, multi-segment video 422 can have one or more properties described herein with respect to first video 102. For example, in some instances, a multi-segment video 422 can include uncompressed video having any data type(s), file format(s), or other property described herein with respect to first video 102. In some instances, a multi-segment video 422 can include a relatively long video (e.g., longer than one or more example video lengths described herein with respect to first video 102, etc.), such as a video having more than one shot; a video having more than one scene; a video that is longer than 2 seconds, such as longer than 5 seconds, such as longer than 10 seconds, such as longer than 20 seconds, such as longer than 30 seconds, such as longer than 1 minute, etc. For example, in some instances, a multi-segment video 422 can include any length of video up to and including a full-length movie (e.g., two hours, three hours, etc.), television show (e.g., 22 minutes, 44 minutes, one hour, etc.), or other relatively long video.

A segmentation 424 operation can include, for example, any means of segmenting a multi-segment video 422 into segments 402. For example, in some instances, segmentation 424 can include segmenting the multi-segment video 422 based on a fixed number of frames per segment 402, or can include adaptively segmenting the multi-segment video 422 into a plurality of segments (e.g., different-length segments, etc.) based on one or more properties of the multi-segment video 422. For example, in some instances, segmentation 424 can include detecting (e.g., using one or more machine-learned scene detection models, etc.) one or more boundaries between scenes of the multi-segment video 422, or one or more boundaries between shots of the multi-segment video 422; and segmenting based on the one or more detected boundaries. As another example, in some instances, segmentation 424 can include segmenting based on a metric of change between frames or groups of frames of the multi-segment video 422. Example metrics of change between frames or groups of frames can include, for example, a metric of difference between pairs of frames (e.g., absolute pixel difference, etc.), a metric of motion (e.g., optical flow, etc.), or other metric of change (e.g., bitrate of a variable-bitrate compression method, etc.).

In some instances, a training 426 operation can include one or more operations described herein with respect to FIG. 1, such as compressing and decompressing one or more segments 402 to generate decompressed video (e.g., one or more respective decompressed video segments, etc.); providing, for each of a plurality of training iterations, one or more frames of the decompressed video to a corresponding segment-specific machine-learned model 412 associated with the segment 402; generating, at each of the plurality of training iterations, by the segment-specific machine-learned model 412, a training output (e.g., reconstructed video 114, etc.) based on the one or more frames of the decompressed video; and updating, at each of the plurality of training iterations, based on an evaluation of the training output, the segment-specific machine-learned model 412.

Figure 4B:
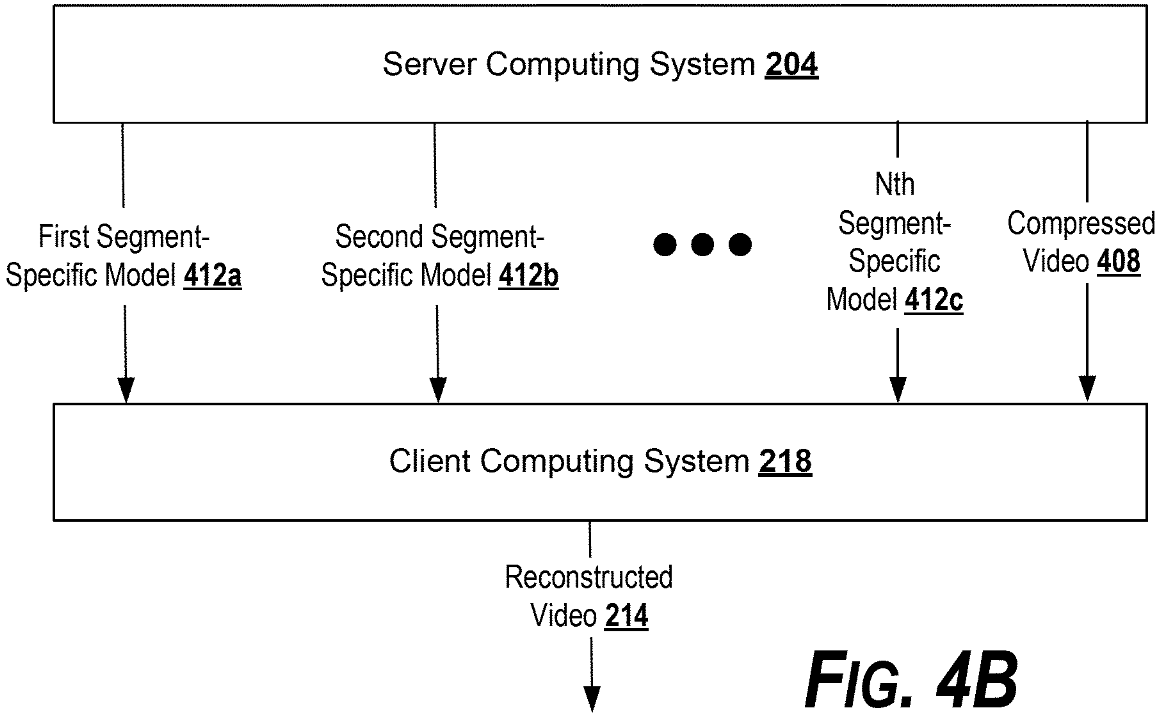
FIG. 4B is a block diagram of an example system for transmitting compressed video over a communication channel according to example implementations of aspects of the present disclosure.

FIG. 4B is a block diagram of an example system for transmitting compressed video over a communication channel according to example implementations of aspects of the present disclosure. A server computing system 204 can transmit, to a client computing system 218 over a communication channel, compressed video 408 associated with a plurality of segments 402 and a plurality of segment-specific machine-learned models 412 associated with the plurality of segments 402. For each respective segment 402 of the plurality of segments 402, the client computing system 218 can generate, using a segment-specific machine-learned model 412 associated with the segment 402 and based on compressed video 408 associated with the segment 402 (e.g., based on decompressed video generated from the compressed video 408, etc.), reconstructed video 414 associated with the segment 402.

In some instances, each component depicted in FIG. 4B can have any property described herein with respect to a component having a similar (e.g., same) name or part number, such as any property described herein with respect to FIG. 2 or 4A.

In some instances, compressed video 408 can include a single compressed video 108 (e.g., compressed video file, data stream, container, etc.) generated from a multi-segment video 422 (e.g., by providing the multi-segment video 422 to a compression 106*a* algorithm of a lossy codec 106, etc.), or a plurality of compressed videos 108 (e.g., files, containers, streams, packets, etc.) generated from a plurality of segments 402 (e.g., by separately providing each of the plurality of segments 402 to a compression 106*a* algorithm of a lossy codec 106, etc.). In some instances, compressed video 408 data can include data indicative of the plurality of segments 402 that were used to train the plurality of segment-specific machine-learned models 412, such as a plurality of separate compressed video 408 segments; timestamp data (e.g., segment start and segment end timestamps; segment duration data; etc.) indicative of one or more boundaries between segments of a multi-segment compressed video 408; or other data indicative of the plurality of segments 402 that were used to train the plurality of segment-specific machine-learned models 412. As a non-limiting illustrative example, in some instances, an example data format for providing compressed video 408 and a plurality of segment-specific machine-learned models 412 can include an interleaved format, wherein each segment-specific machine-learned model 412 is transmitted before (e.g., slightly before, immediately before, etc.) a corresponding compressed representation of a corresponding segment 402 associated with the segment-specific machine-learned model 412. As another example, in some instances, an example data format for providing compressed video 408 can include a single compressed video 408 file associated with a plurality of segments 402, along with data (e.g., timestamp data, frame identification number data, etc.) identifying each segment of the plurality of segments (e.g., identifying one or more boundaries between segments, etc.) Other implementations are possible.

Figure 5A:
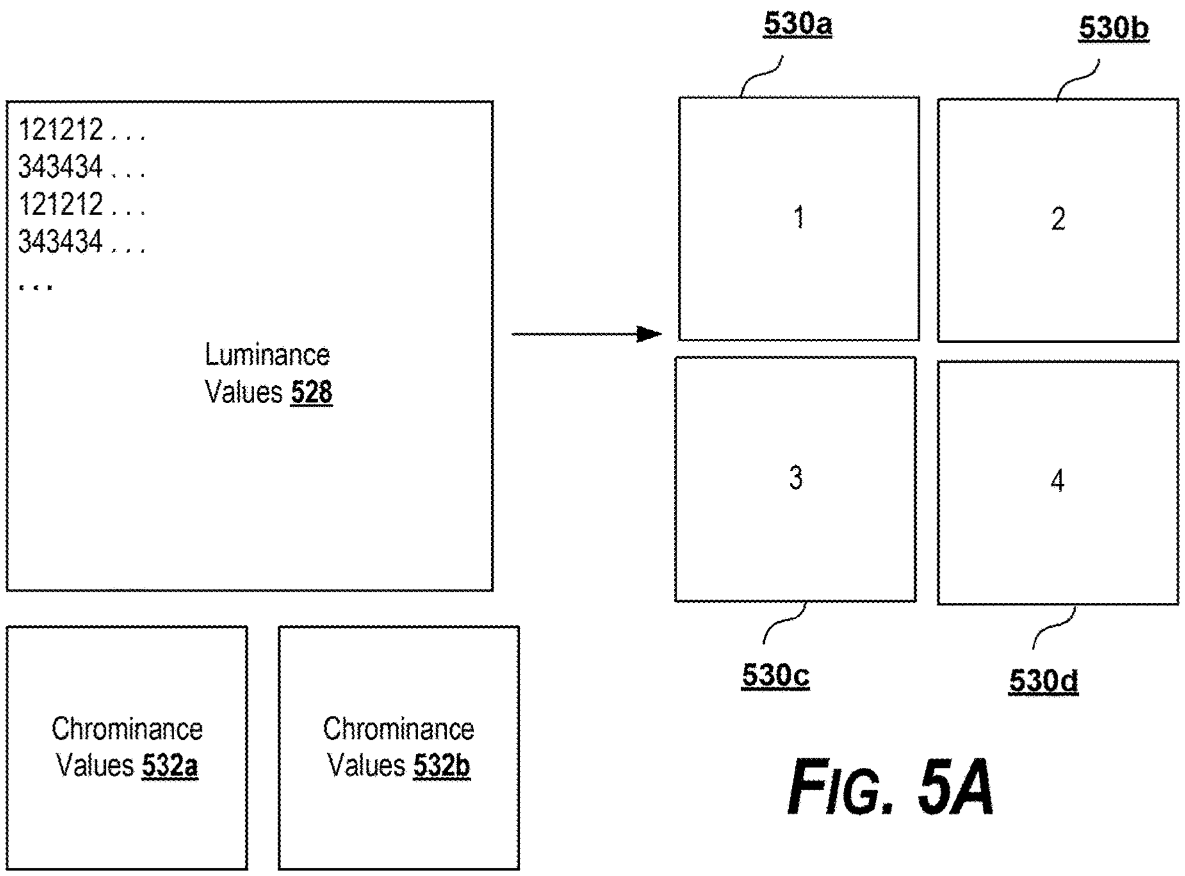
FIG. 5A is an illustration of an example pixel shuffling operation according to example implementations of aspects of the present disclosure.

FIG. 5A is an illustration of an example pixel shuffling operation according to example implementations of aspects of the present disclosure. A computing system can obtain a first video 102 frame comprising a luminance tensor 528 (e.g., two-dimensional matrix, etc.) of luminance values associated with a plurality of pixels and one or more chrominance tensors 532*a*, 532*b* of chrominance values associated with the plurality of pixels. In some instances, a luminance tensor 528 can include a two-dimensional matrix having one luminance value for each of the plurality of pixels (e.g., an H×W two-dimensional matrix, where His a height in pixels of the frame, and W is a width in pixels of the frame, etc.), and a chrominance tensor 532 can include a two-dimensional matrix having less than one chrominance value per pixel (e.g., a two-dimensional $$\frac{H}{2} \times \frac{W}{2}$$

matrix having one chrominance value per four-pixel 2×2 region, etc.). In some instances, a pixel shuffling operation can include mapping luminance values of the luminance tensor 528 to a plurality of smaller luminance tensors 530, such as a plurality of smaller tensors 530*a*, 530*b*, 530*c*, 530*d* having a shape that is the same as a shape of a chrominance tensor 532. In some instances, mapping can include dividing each of a plurality of M×N regions (e.g., 2×2 regions, etc.) of the tensor 528 among the plurality of tensors 530, wherein M and N can be positive integers that are the same as or different from each other.

A tensor 528 of luminance values can include, for example, a plurality of luminance values (e.g., pixel luminance values, brightness values, etc.) associated with a single video frame (e.g., decompressed video frame 110, etc.). Luminance values can include, for example, any data indicative of a luminous intensity (e.g., brightness, etc.) of light associated with a pixel. For example, in some instances, a luminance value can include a luma value (e.g., weighted sum of gamma-compressed color channel components such as red/green/blue channels, etc.), a relative luminance value (e.g., weighted sum of linear color channel components, etc.), or other luminance value. As a non-limiting illustrative example, in some instances, example luma values can include CCIR 601 luma values (0.299R'+0.587G'+0.114B', where R' can be a gamma-compressed red value, G' can be a gamma-compressed green value, and B' can be a gamma-compressed blue value), BT. 709 luma values (0.2126R'+0.7152G'+0.0722B'), or other weighted sum.

In some instances, a tensor 528 of luminance values can include a two-dimensional matrix having two dimensions (e.g., a height and width) that are larger than two corresponding dimensions of one or more tensors 532 of chrominance values. For example, in some instances, a decompressed video frame 110 can be encoded using chroma subsampling, wherein a size of each tensor 532 of chrominance values can be smaller than a size of a tensor 528 of luminance values for the same decompressed video frame 110. For example, in some instances, a height and width of a luminance tensor 528 can be H and W respectively, wherein H and W are positive integers that can be the same as or different from each other. For example, in some instances, a decompressed video frame 110 can include a frame configured to be displayed at a resolution having a width in pixels of W and a height in pixels of H, and the luminance tensor 528 can also have a height and width of H and W respectively. Continuing the example, in some instances, each chrominance tensor 532 can have a height or width that is smaller than H or W, such as a height or width that is an integer divisor of H or W (e.g., H/2, W/2, etc.). Continuing the example, in some instances, each chrominance value of each tensor 532 of chrominance values can be applied to a plurality of pixels, such as an M-by-N (e.g., 2-by-2, etc.) region of pixels in instances where the height and width of the tensor 532 are H/M and W/N (e.g., H/2 and W/2, etc.).

In some instances, a plurality of smaller tensors 530 of luminance values can include a similar (e.g., same) set of luminance values that are contained in the tensor 528 of luminance values, wherein the set of values is divided among a plurality of smaller tensors 530. For example, in some instances, each of the smaller tensors 530 can have a height and width that is an integer divisor of a height H and width W of the luminance tensor 528, such as H/2 and W/2; such as a height and width that are the same as a height and width of each chrominance tensor 532; or the like. For example, in some instances, each smaller luminance tensor 530 and each chrominance tensor 532 can have a height and width of H/M and W/N (e.g., H/2 and W/2, etc.), and the luminance values of the tensor 528 can be divided among the plurality of smaller luminance tensors 530 according to a pixel shuffling operation (e.g., space-to-depth or space2depth operation, etc.). For example, in some instances, a plurality of M*N (e.g., 2*2=4, etc.) smaller luminance tensors 530 (e.g., tensors 530 having a height and width of H/M and W/N) can be populated by identifying a plurality of M-by-N regions of the larger luminance tensor 528; and assigning one pixel from each M-by-N region to each of the plurality of smaller luminance tensors 530. For example, as depicted in FIG. 5A, a plurality of 2-by-2 regions of the luminance tensor 528 are each labeled in the diagram of FIG. 5A as:

12
34.

Continuing the example, in some instances, each value labeled "1" can be assigned to the smaller tensor 530*a* labeled "1" in FIG. 5A; each value labeled "2" can be assigned to the smaller tensor 530*a* labeled "2" in FIG. 5A; and so on. For clarity, the numbers "1," "2," "3," and "4" of FIG. 5A do not depict luminance values themselves, and instead depict labels indicative of a position of a corresponding luminance value within a luminance tensor 528. In some instances, a relative position of the values within each smaller tensor 530 can be similar to (e.g., same as; identical but for a scaling factor; etc.) a relative position of the same set of values within the larger luminance tensor 528. For example, each value of the top-leftmost 2×2 region of the tensor 528 can correspond to a top-leftmost value of a corresponding tensor 530, and so on.

A tensor 532 can include, for example, a plurality of chrominance values associated with a decompressed video frame 110, such as a plurality of chrominance values each associated with an M-by-N region (e.g., 2-by-2 region, etc.) of pixels of the decompressed video frame 110, wherein a height and width of the tensor 532 is H/M and W/N, where H and W are a display height and display width in pixels, respectively, of the decompressed video frame. In some instances, a chrominance value can include a color difference value, such as a difference between a first color intensity value and a corresponding luminance value (e.g., luminance value associated with the same pixel, etc.). In some instances, a chrominance value can include a chroma value, such as a YUV chroma value (e.g., U value such as B'-Y', where B' is a gamma-compressed blue value and Y' is a luminance value such as a luma value, V value such as R'-Y', where R' is a gamma-compressed red value, etc.).

A tensor 534*a*, 534*b* of positional embedding values can include, for example, a two-dimensional matrix of positional embedding values, such as a two-dimensional matrix having a shape similar to (e.g., same as, etc.) a chrominance tensor 532 or smaller luminance tensor 530. In some instances, an X positional embedding tensor 534*a* can include a tensor comprising a plurality of respective embeddings of a plurality of respective X positions (e.g., positions on an X axis; column number of a corresponding pixel in a row-column grid of pixels; column number of a column of the tensor 534 in which the X positional embedding value is located; etc.). In some instances, a Y positional embedding tensor 534*a* can include a tensor comprising a plurality of respective embeddings of a plurality of respective Y positions (e.g., positions on an Y axis; row number of a corresponding pixel in a row-column grid of pixels; row number of a row of the tensor 534 in which the Y positional embedding value is located; etc.). In some instances, each respective positional embedding value located in a respective location (e.g., row-column location, etc.) of each tensor 534*a*, 534*b* can correspond to a positional embedding of one or more respective luminance or chrominance values in the same position within a tensor 530, 532 (e.g., positional embedding of an X position or Y position within a display frame of a pixel associated with a respective luminance or chrominance value, etc.). A positional embedding can include, for example, any data indicative of a position value, such as a sinusoidal positional embedding, linear positional embedding, rotary positional embedding, or other value indicative of an X position or Y position.

Figure 5B:
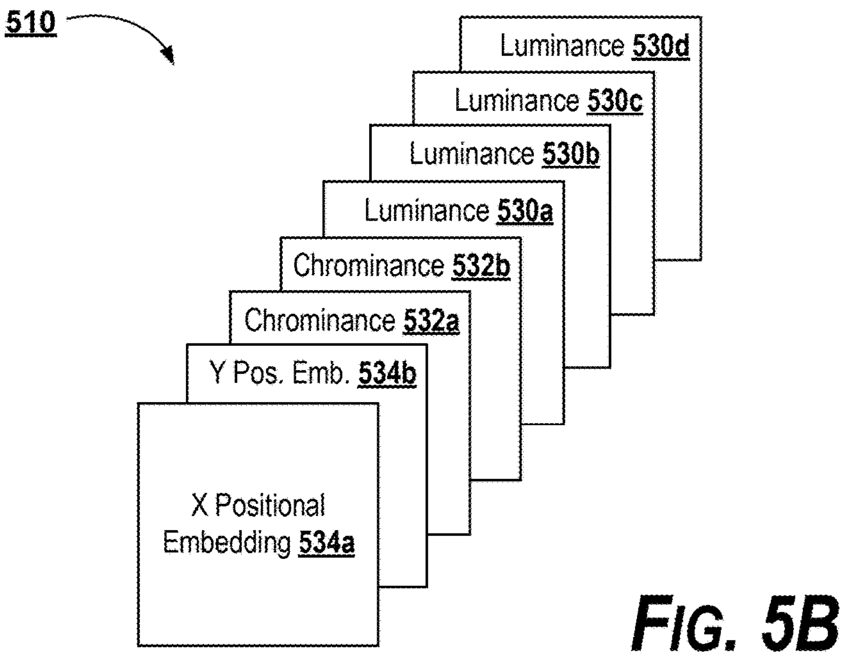
FIG. 5B is an illustration of an example tensor data structure for providing a video frame to a video-specific machine-learned model according to example implementations of aspects of the present disclosure.

FIG. 5B is an illustration of an example tensor 510 data structure for providing a decompressed video frame 110 to a video-specific machine-learned model 112 according to example implementations of aspects of the present disclosure. The example tensor 510 can include one or more of: an X positional embedding tensor 534*a* (e.g., two-dimensional matrix, etc.) comprising a plurality of positional embeddings of x coordinate values (e.g., normalized x coordinate values, etc.) associated with a plurality of pixels; a Y positional embedding tensor 534*b* (e.g., two-dimensional matrix, etc.) comprising a plurality of positional embeddings of y coordinate values (e.g., normalized y coordinate values, etc.) associated with a plurality of pixels; one or more chrominance tensors 532*a*, 532*b* of chrominance values (e.g., U tensor and V tensor of a YUV color representation, etc.); and one or more luminance tensors (e.g., plurality of luminance tensors 530 obtained according to methods described herein with respect to FIG. 5A, etc.) of luminance values. In some instances, the example tensor 510 can include a three-dimensional tensor comprising a plurality of two-dimensional matrix layers (e.g., two-dimensional matrices 530, 532, 534, etc.), such as a plurality of two-dimensional matrix layers concatenated along a third dimension (e.g., plurality of n-dimensional tensors comprising n-dimensional luminance tensors, n-dimensional chrominance tensors, and n-dimensional positional embedding tensors concatenated along an (n+1)th dimension, where n can be a positive integer such as 2, etc.). In some instances, a tensor 510 can be provided as input to a video-specific machine-learned model 112, and the video-specific machine-learned model 112 can generate a reconstructed frame 114 based on the tensor 510.

A tensor 510 can include, for example, data indicative of a single decompressed video frame 110, in a format configured to be provided to some example video-specific machine-learned models 112 according to some aspects of the present disclosure. In some instances, a tensor 510 can be, comprise, be comprised by, or otherwise share one or more properties with a decompressed video frame 110. For example, in some instances, a tensor 510 can have any property described herein with respect to a decompressed video frame 110, and vice versa. Although FIG. 5B depicts a particular set of components in a particular order for purposes of illustration and description, other shapes and components are possible. For example, in some instances, two-dimensional matrices 530, 532, 534 of a tensor 510 can be arranged in any order without deviating from the scope of the present disclosure. As another example, in some instances, one or more additional values (e.g., metadata values, etc.) can be added to a tensor 510 without deviating from the scope of the present disclosure. As another example, in some instances, one or more existing values (e.g., two-dimensional matrices, etc.) can be omitted or combined (e.g., combined X-Y positional embedding, etc.) without deviating from the scope of the present disclosure.

In some instances, an output of the video-specific machine-learned model 112 generated based on an input three-dimensional tensor 510 can include an output having a similar (e.g., same) or different shape compared to the tensor 510. For example, in some instances, an output can include a three-dimensional tensor output (e.g., output comprising luminance values, chrominance values, and zero or more other values, etc.), and the three-dimensional tensor output can be converted (e.g., rearranged, pixel-shuffled, converted according a non-machine-learned conversion formula, etc.) to a reconstructed frame 114 in a display format or format configured to be provided to a display device (e.g., RGB format, etc.). Other implementations are possible.

Example Methods

Figure 6:
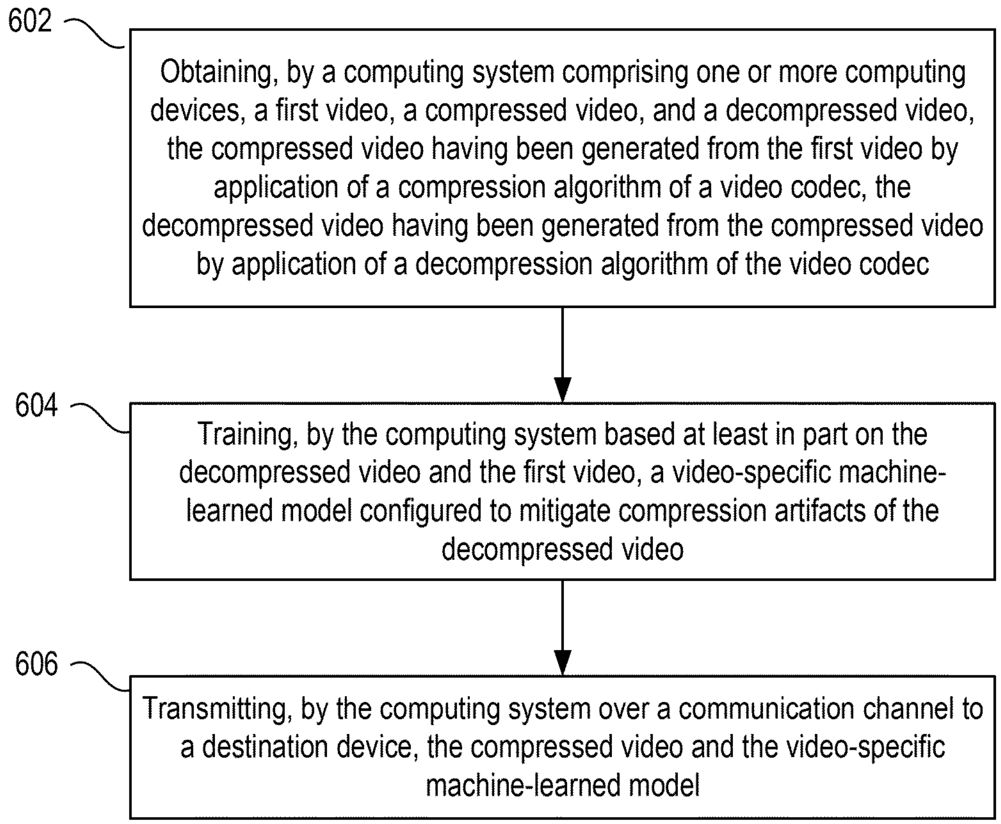
FIG. 6 is a flow chart diagram of an example method for transmitting compressed video over a communication channel according to example implementations of aspects of the present disclosure.

FIG. 6 depicts a flowchart diagram of an example method for transmitting video data over a communication channel according to example embodiments of the present disclosure. Although FIG. 6 depicts steps performed in a particular order for purposes of illustration and discussion, the methods of the present disclosure are not limited to the particularly illustrated order or arrangement. The various steps of example method 600 can be omitted, rearranged, combined, and/or adapted in various ways without deviating from the scope of the present disclosure.

At 602, example method 600 can include obtaining, by a computing system (e.g., computing system 104, server computing system 204, etc.) comprising one or more computing devices (e.g., computing system 104, server computing system 204, etc.), a first video (e.g., first video 102, segment 402, etc.), a compressed video (e.g., compressed video 108, etc.), and a decompressed video (e.g., decompressed video comprising decompressed video frames 110, etc.), the compressed video having been generated from the first video by application of a compression algorithm of a video codec (e.g., lossy codec 106, etc.), the decompressed video having been generated from the compressed video by application of a decompression algorithm of the video codec. In some instances, example method 600 at 602 can include using one or more systems or performing one or more activities described with respect to FIG. 1.

At 604, example method 600 can include training, by the computing system based at least in part on the decompressed video and the first video, a video-specific machine-learned model (e.g., video-specific machine-learned model 112, 312*a*, 312*b*, 412, etc.) configured to mitigate compression artifacts of the decompressed video. In some instances, example method 600 at 604 can include using one or more systems or performing one or more activities described with respect to FIG. 1 or 3-5B.

At 606, example method 600 can include transmitting, by the computing system over a communication channel (e.g., network such as the internet, etc.) to a destination device (e.g., client computing system 218, etc.), the compressed video and the video-specific machine-learned model. In some instances, example method 600 at 606 can include using one or more systems or performing one or more activities described with respect to FIG. 2.

Figure 7:
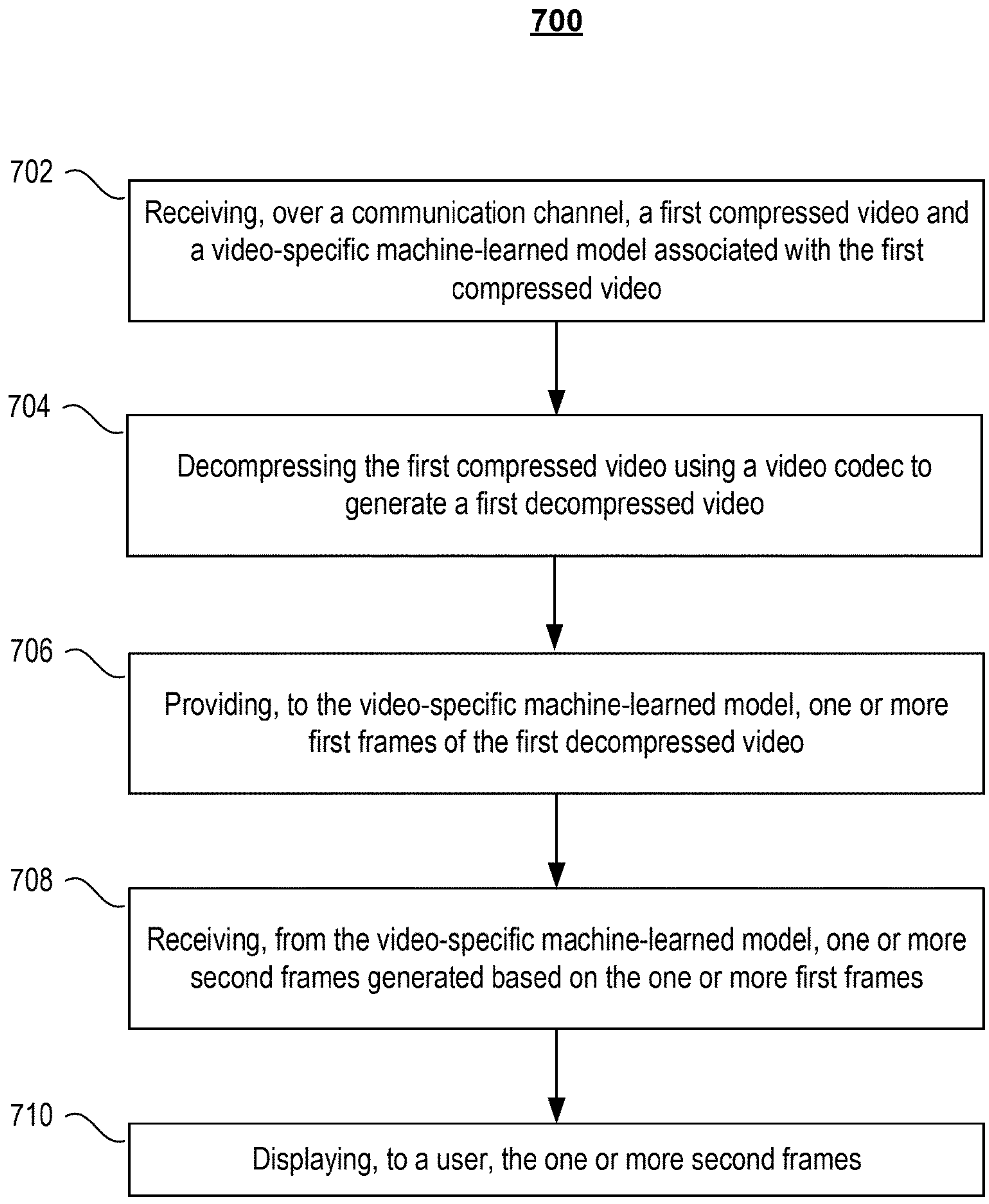
FIG. 7 is a flow chart diagram of an example method for out-of-loop filtering of compressed video according to example implementations of aspects of the present disclosure.

FIG. 7 depicts a flowchart diagram of an example method for receiving video data over a communication channel according to example embodiments of the present disclosure. Although FIG. 7 depicts steps performed in a particular order for purposes of illustration and discussion, the methods of the present disclosure are not limited to the particularly illustrated order or arrangement. The various steps of example method 700 can be omitted, rearranged, combined, and/or adapted in various ways without deviating from the scope of the present disclosure.

At 702, example method 700 can include receiving (e.g., by a computing system such as a client computing system 218, etc.), over a communication channel (e.g., network such as the internet, etc.), a first compressed video (e.g., compressed video 108, etc.) and a video-specific machine-learned model (e.g., video-specific machine-learned model 112, 312, 412, etc.) associated with the first compressed video. In some instances, example method 700 at 702 can include using one or more systems or performing one or more activities described with respect to FIG. 2.

At 704, example method 700 can include decompressing the first compressed video using a video codec to generate a first decompressed video. In some instances, example method 700 at 704 can include using one or more systems or performing one or more activities described with respect to FIG. 2.

At 706, example method 700 can include providing, to the video-specific machine-learned model, one or more first frames (e.g. decompressed video frames 110, tensors 510, etc.) of the first decompressed video. In some instances, example method 700 at 706 can include using one or more systems or performing one or more activities described with respect to FIG. 2.

At 708, example method 700 can include receiving, from the video-specific machine-learned model, one or more second frames (e.g., reconstructed frames 114, etc.) generated based on the one or more first frames. In some instances, example method 700 at 708 can include using one or more systems or performing one or more activities described with respect to FIG. 2.

At 710, example method 700 can include displaying, to a user (e.g., user 220, etc.), the one or more second frames. In some instances, example method 700 at 710 can include using one or more systems or performing one or more activities described with respect to FIG. 2.

Figure 8:
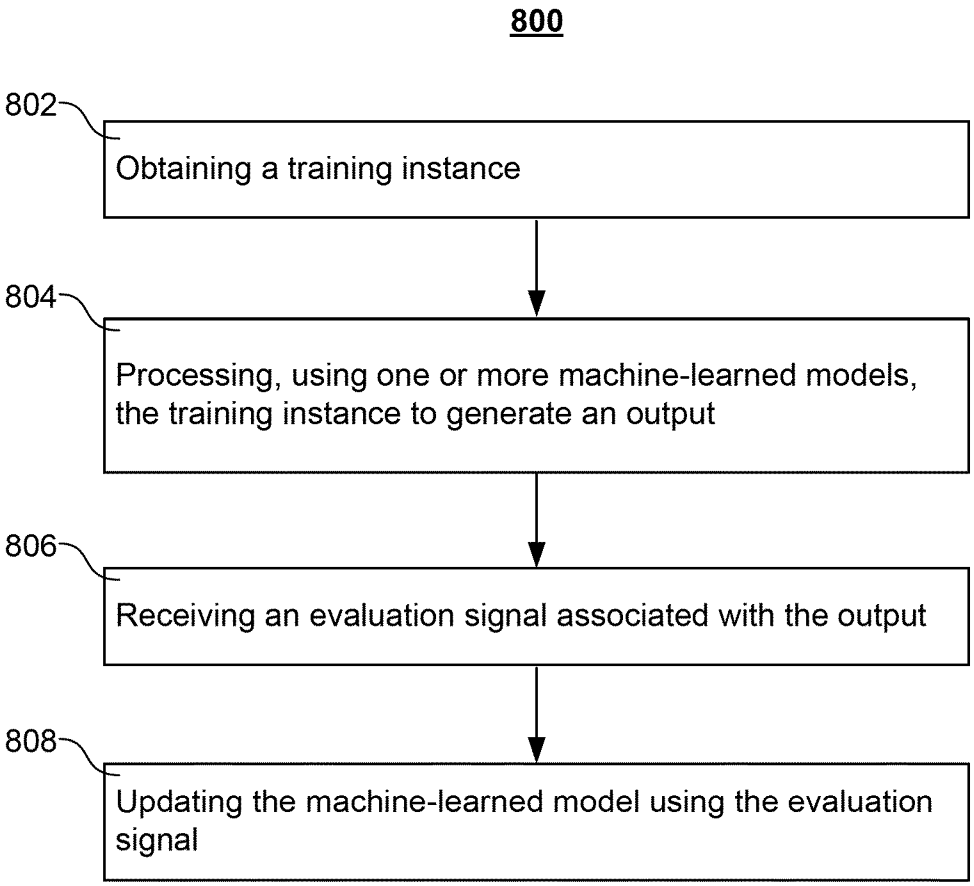
FIG. 8 is a flow chart diagram illustrating an example method for training a machine-learned model according to example implementations of aspects of the present disclosure.

FIG. 8 depicts a flowchart of a method 800 for training one or more machine-learned models according to aspects of the present disclosure. For instance, an example machine-learned model can include a video-specific machine-learned model 108.

One or more portion(s) of example method 800 can be implemented by a computing system that includes one or more computing devices such as, for example, computing systems described with reference to the other figures. Each respective portion of example method 800 can be performed by any (or any combination) of one or more computing devices. Moreover, one or more portion(s) of example method 800 can be implemented on the hardware components of the device(s) described herein, for example, to train one or more systems or models. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of example method 800 can be performed additionally, or alternatively, by other systems.

At 802, example method 800 can include obtaining a training instance. A set of training data can include a plurality of training instances divided between multiple datasets (e.g., a training dataset, a validation dataset, or testing dataset). A training instance can be labeled or unlabeled. Although referred to in example method 800 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 804, example method 800 can include processing, using one or more machine-learned models, the training instance to generate an output. The output can be directly obtained from the one or more machine-learned models or can be a downstream result of a chain of processing operations that includes an output of the one or more machine-learned models.

At 806, example method 800 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

At 808, example method 800 can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 800 can include implementing a number of generalization techniques (e.g., weight decays, dropouts, etc.) to improve the generalization capability of the models being trained.

In some implementations, example method 800 can be implemented for training a machine-learned model from an initialized state to a fully trained state (e.g., when the model exhibits a desired performance profile, such as based on accuracy, precision, recall, etc.).

In some implementations, example method 800 can be implemented for particular stages of a training procedure. For instance, in some implementations, example method 800 can be implemented for pre-training a machine-learned model. Pre-training can include, for instance, large-scale training over potentially noisy data to achieve a broad base of performance levels across a variety of tasks/data types. In some implementations, example method 800 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

Example Machine-Learned Models

Figure 9:
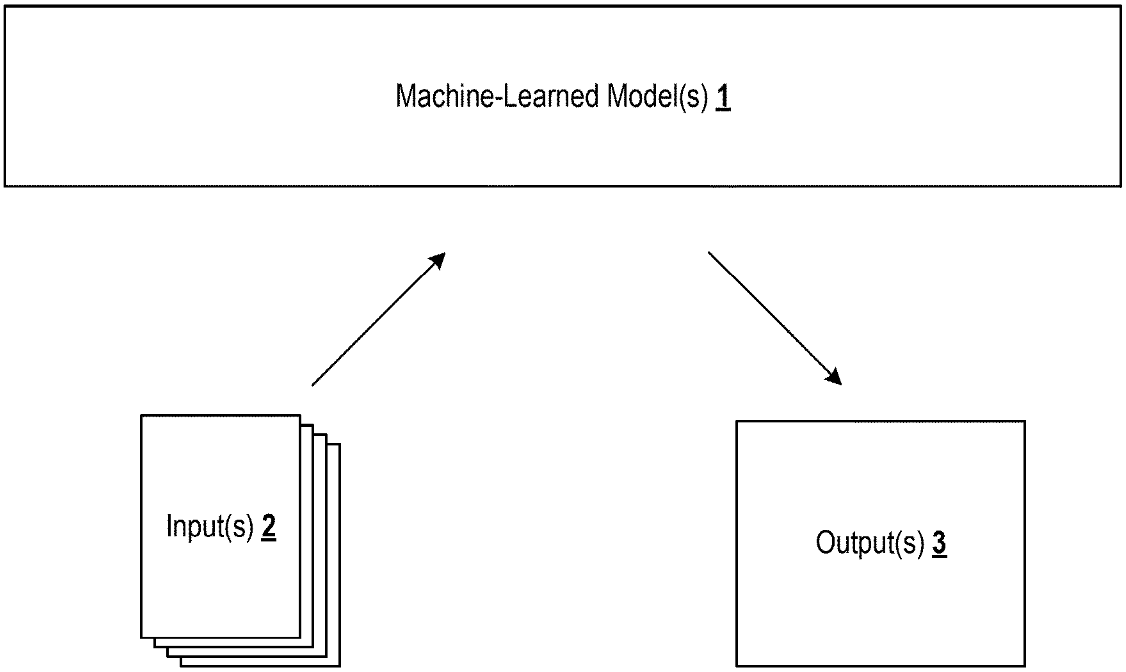
FIG. 9 is a block diagram of an example processing flow for using machine-learned model(s) to process input(s) to generate output(s) according to example implementations of aspects of the present disclosure.

FIG. 9 is a block diagram of an example processing flow for using machine-learned model(s) 1 to process input(s) 2 to generate output(s) 3.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1 can include a single or multiple instances of the same model configured to operate on data from input(s) 2. Machine-learned model(s) 1 can include an ensemble of different models that can cooperatively interact to process data from input(s) 2. For example, machine-learned model(s) 1 can employ a mixture-of-experts structure. See, e.g., Zhou et al., Mixture-of-Experts with Expert Choice Routing, ARXIV: 2202.09368v2 (Oct. 14, 2022).

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), chemical or biochemical data, image data, audio data, audiovisual data, haptic data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and astronomical data, sensor data and chemical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Example Machine-Learned Sequence Processing Models

Figure 10:
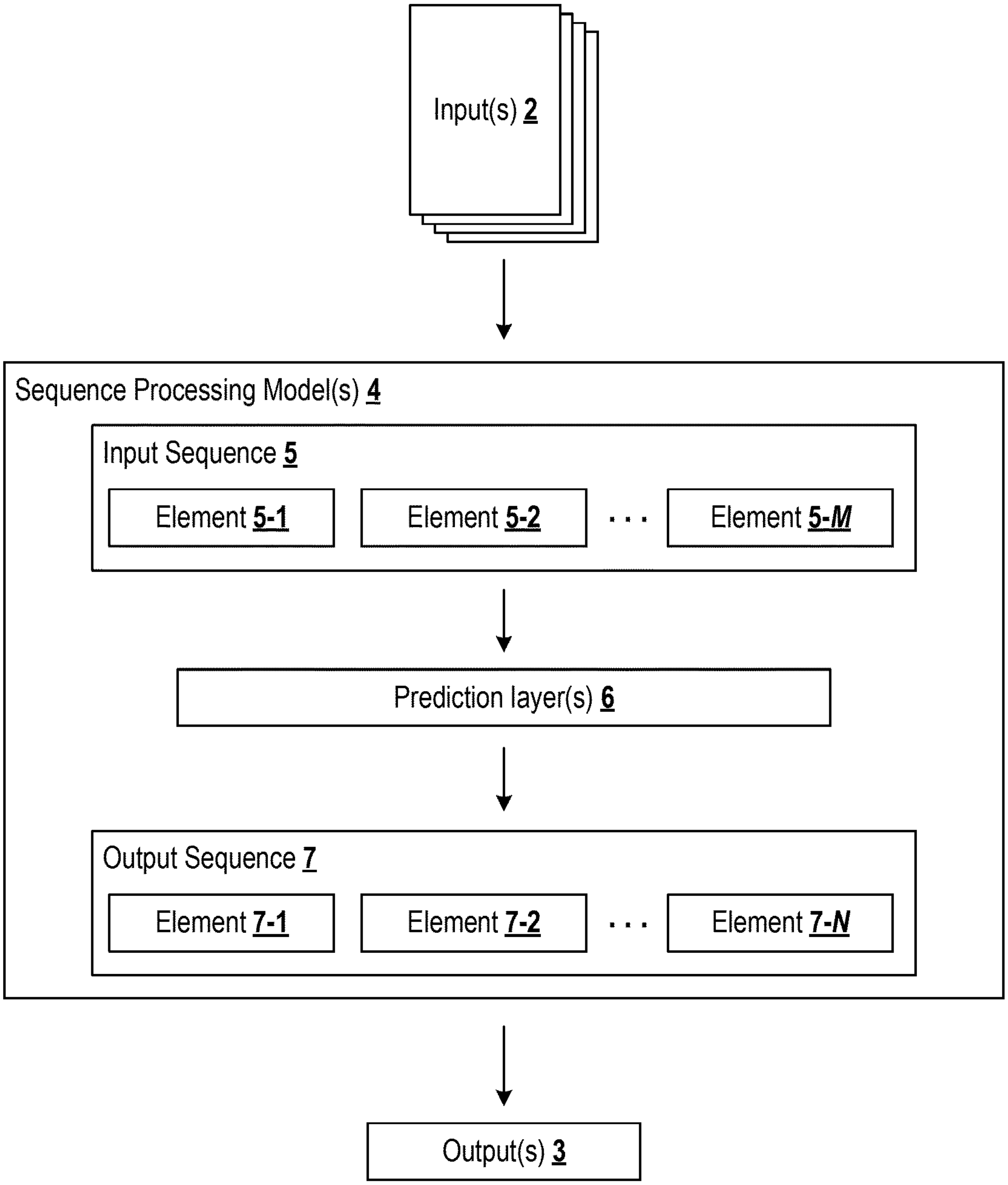
FIG. 10 is a block diagram of an example sequence processing model according to example implementations of aspects of the present disclosure.

FIG. 10 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, GOOGLE, https://ai.google/static/documents/palm2techreport.pdf (n.d.). Other example sequence processing models can operate in other domains, such as image domains, see, e.g., Dosovitskiy et al., *An Image is Worth* 16×16 *Words: Transformers for Image Recognition at Scale*, ARXIV: 2010.11929v2 (Jun. 3, 2021), audio domains, see, e.g., Agostinelli et al., *MusicLM: Generating Music From Text*, ARXIV: 2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model(s) 4 can process one or multiple types of data simultaneously. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. See, e.g., Kudo et al., *SentencePiece: A simple and language independent subword tokenizer and detokenizer for Neural Text Processing*, Proceedings of the 2018 Conference on Empirical Methods in Natural Language Processing (System Demonstrations), pages 66-71 (Oct. 31-Nov. 4, 2018), https://aclanthology.org/D18-2012.pdf. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 10 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input(s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of" Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 4. See, e.g., Vaswani et al., Attention Is All You Need, ARXIV: 1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, ARXIV: 2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 11:
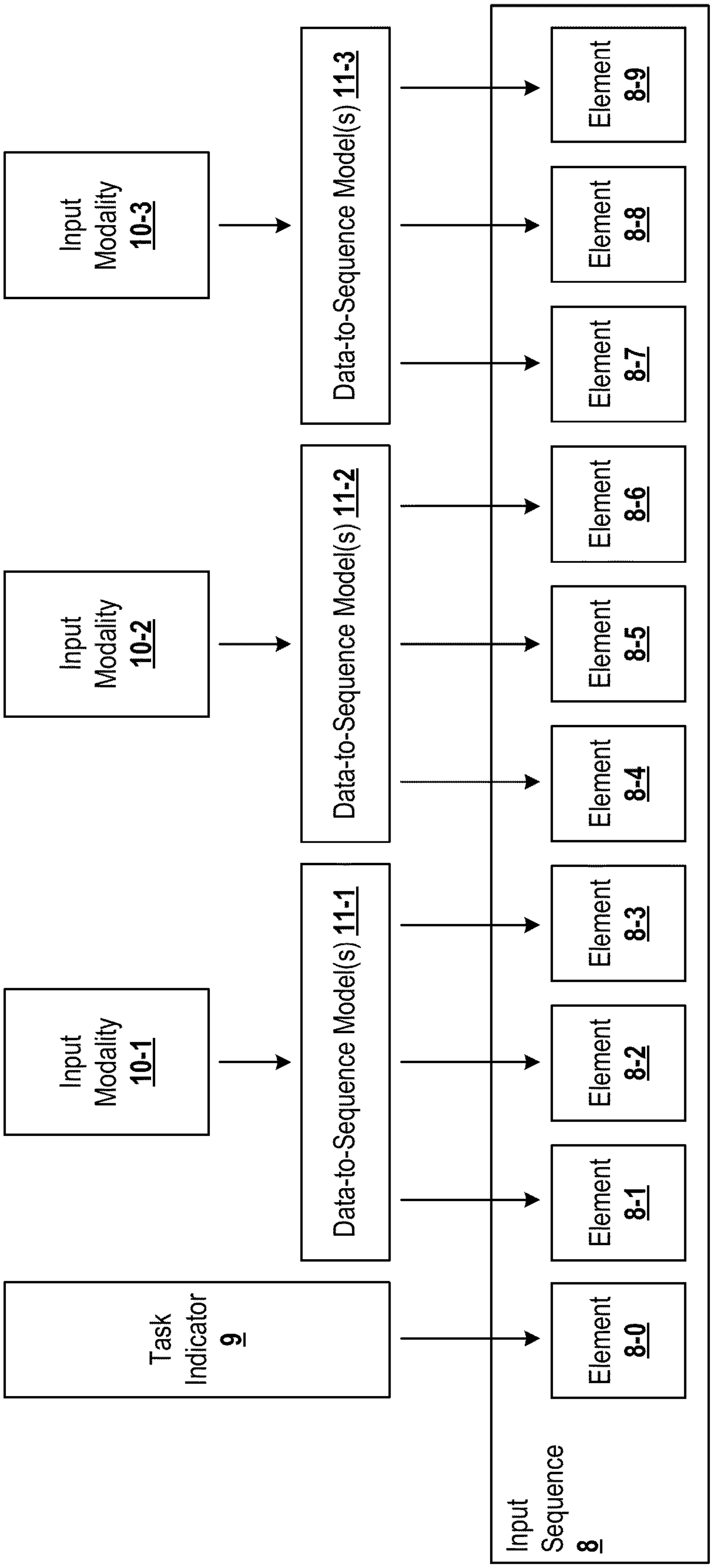
FIG. 11 is a block diagram of an example technique for populating an example input sequence for processing by a sequence processing model according to example implementations of aspects of the present disclosure.

FIG. 11 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be learned within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Example Machine-Learned Model Development Platform

Figure 12:
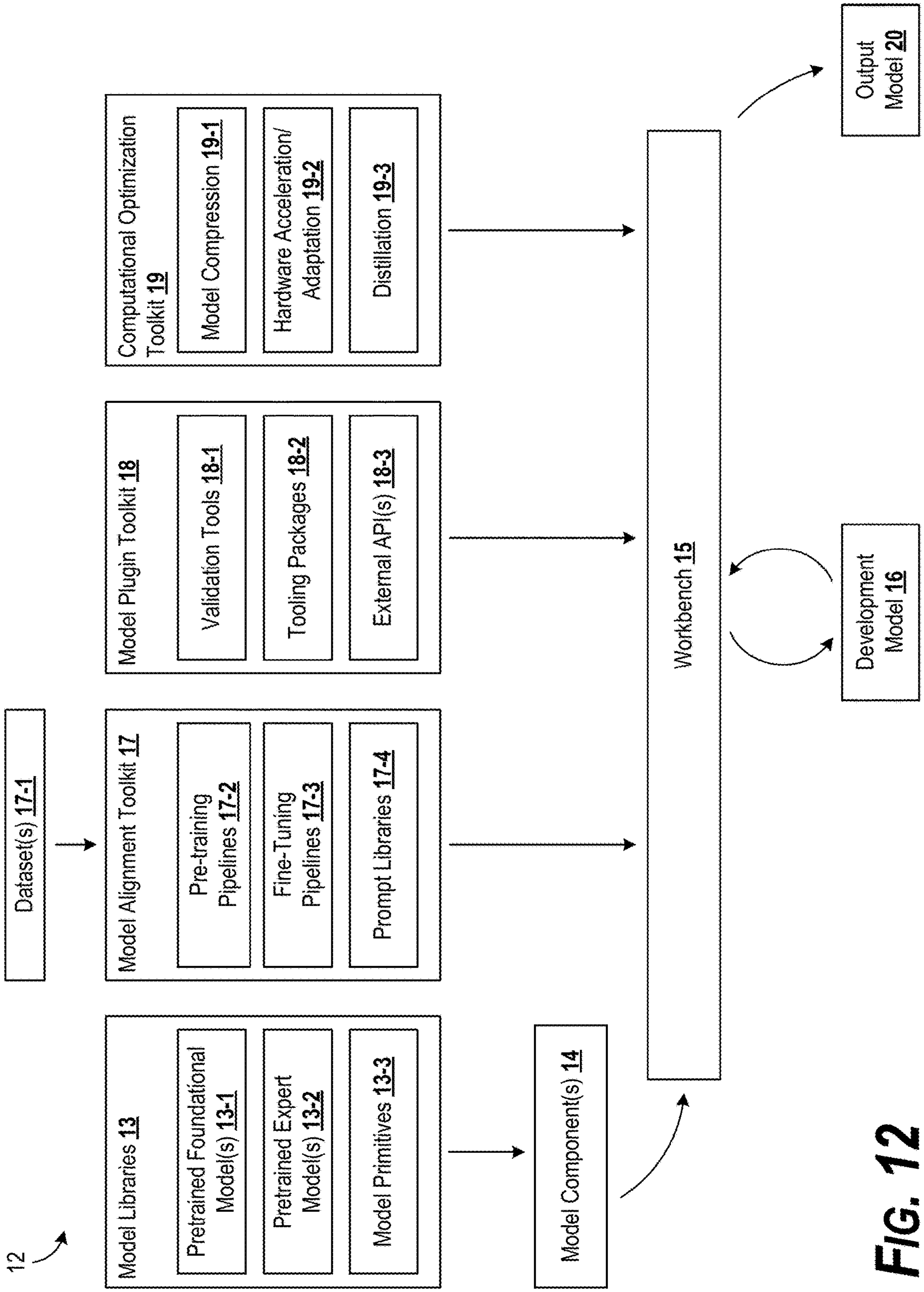
FIG. 12 is a block diagram of an example model development platform according to example implementations of aspects of the present disclosure.

FIG. 12 is a block diagram of an example model development platform 12 that can facilitate creation, adaptation, and refinement of example machine-learned models (e.g., machine-learned model(s) 1, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing an accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals. Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without exemplars in the inputs. For instance, zero-shot prompts can include inputs that lack exemplars. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based on one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output a input for a second model to process in order to perform a step of the task. The second model can be the same as or different from the first model. Workbench 15 can implement prompt generation pipelines in development model 16.

Prompt libraries 17-4 can include pipelines for context injection. For instance, a performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 800 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instructions that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 13:
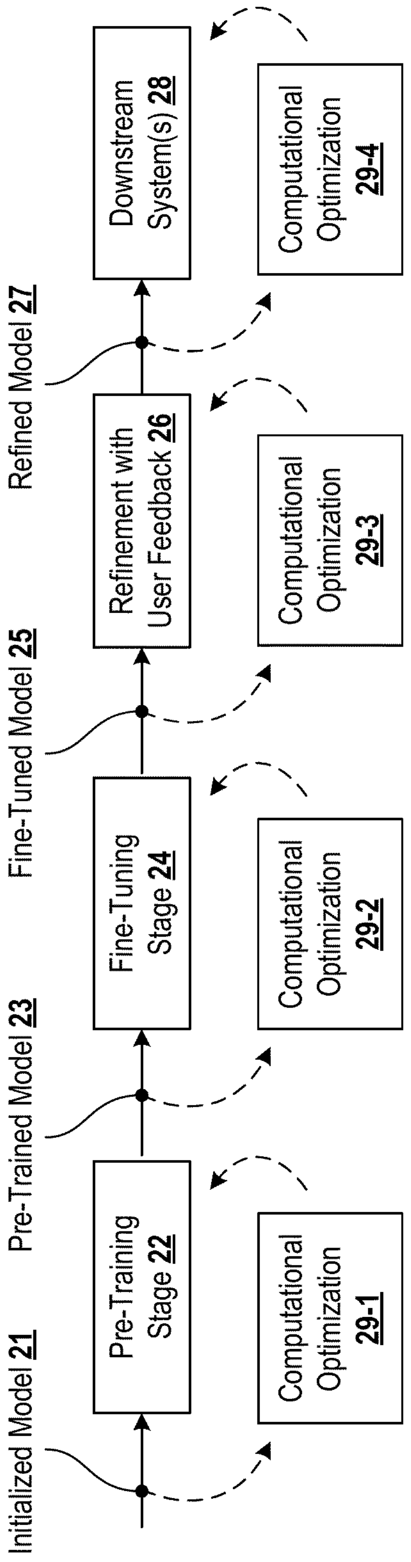
FIG. 13 is a block diagram of an example training workflow for training a machine-learned model according to example implementations of aspects of the present disclosure.

FIG. 13 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 13 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model has satisfactory performance, if the model was already fine-tuned, or if other tuning approaches are preferred.

Fine-tuned model 25 can then be a new version of development model 16, which can persist as development model 16 or as a new development model. Fine-tuned model 25 can be the initial state if development model 16 was already fine-tuned. Fine-tuned model 25 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2 (e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Example Machine-Learned Model Inference System

Figure 14:
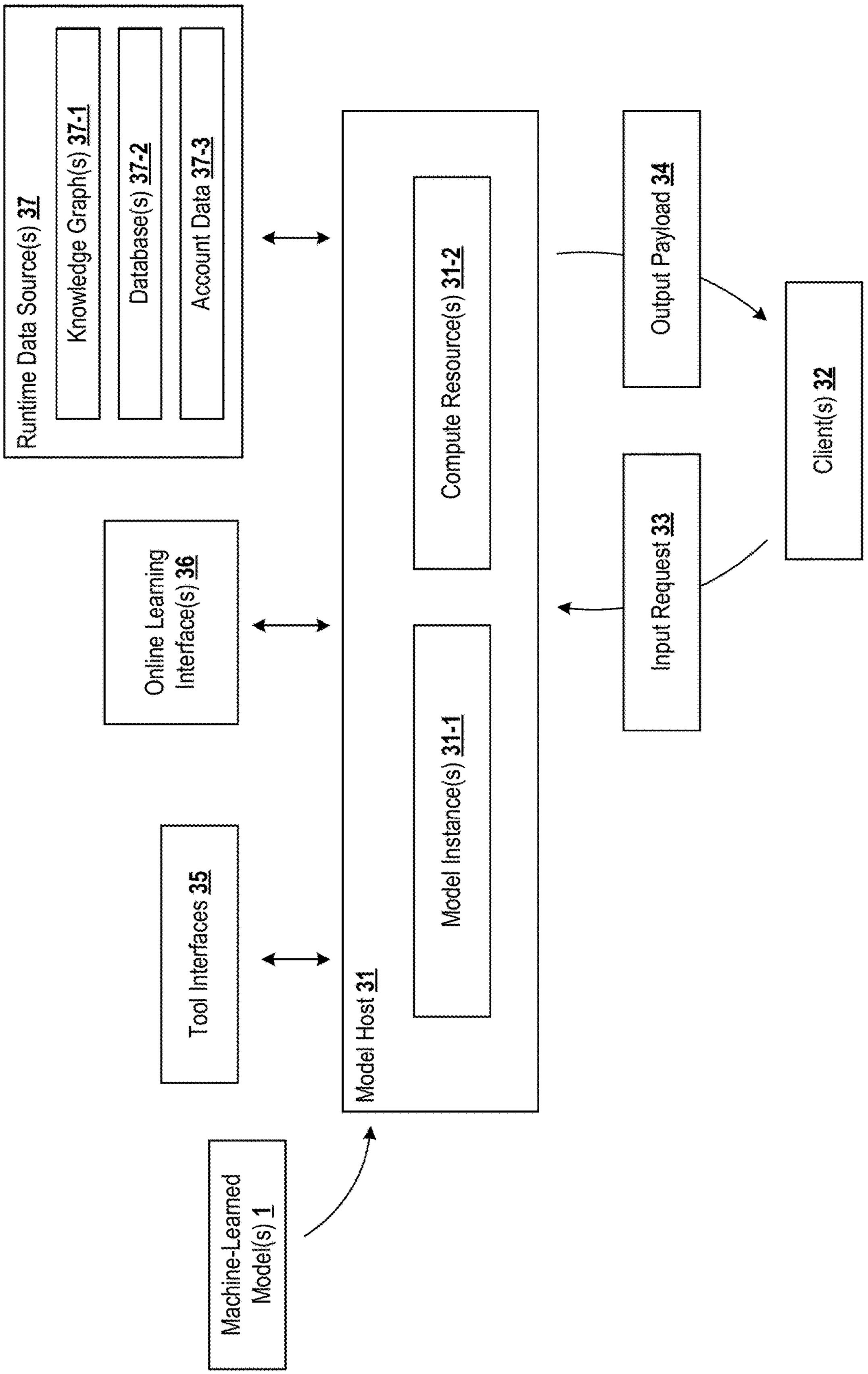
FIG. 14 is a block diagram of an inference system for operating one or more machine-learned model(s) to perform inference according to example implementations of aspects of the present disclosure.

FIG. 14 is a block diagram of an inference system for operating one or more machine-learned model(s) 1 to perform inference (e.g., for training, for deployment, etc.). A model host 31 can receive machine-learned model(s) 1. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 2 for input to machine-learned model(s) 1. Machine-learned model(s) 1 can process input(s) 2 to generate output(s) 3. Using output(s) 3, model host 31 can return an output payload 34 for responding to input request 33 from client(s) 32. Output payload 34 can include or be based on output(s) 3.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1. For instance, online learning interface(s) 36 can be used within reinforcement learning loops to retrieve user feedback on inferences served by model host 31. Model host 31 can access runtime data source(s) 37 for augmenting input(s) 2 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 2. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) 2 can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on a same device or system as client(s) 32. Model host 31 can be a machine-learning service that runs on-device to provide machine-learning functionality to one or multiple applications operating on a client device, which can include an application implementing client(s) 32. Model host 31 can be a part of a same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also shard model instance(s) across multiple memory devices (e.g., using data parallelization or tensor parallelization, etc.). This can be done to increase parallelization or to execute a large model using multiple memory devices which individually might not be able to fit the entire model into memory.

Input request 33 can include data for input(s) 2. Model host 31 can process input request 33 to obtain input(s) 2. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 2 can be distributed across the batch dimension (e.g., rows of an array). The separate input(s) 2 can include completely different contexts. The separate input(s) 2 can be multiple inference steps of the same task. The separate input(s) 2 can be staggered in an input structure, such that any given inference cycle can be operating on different portions of the respective input(s) 2. In this manner, for instance, model host 31 can perform inference on the batch in parallel, such that output(s) 3 can also contain the batch dimension and return the inference results for the batched input(s) 2 in parallel. In this manner, for instance, batches of input request(s) 33 can be processed in parallel for higher throughput of output payload(s) 34.

Output payload 34 can include or be based on output(s) 3 from machine-learned model(s) 1. Model host 31 can process output(s) 3 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1. Online learning interface(s) 36 can facilitate reinforcement learning with human feedback (RLHF). Online learning interface(s) 36 can facilitate federated learning of machine-learned model(s) 1.

Model host 31 can execute machine-learned model(s) 1 to perform inference for various tasks using various types of data. For example, various different input(s) 2 and output(s) 3 can be used for various different tasks. In some implementations, input(s) 2 can be or otherwise represent image data. Machine-learned model(s) 1 can process the image data to generate an output. As an example, machine-learned model(s) 1 can process the image data to generate an image recognition output (e.g., a recognition of the image data, a latent embedding of the image data, an encoded representation of the image data, a hash of the image data, etc.). As another example, machine-learned model(s) 1 can process the image data to generate an image segmentation output. As another example, machine-learned model(s) 1 can process the image data to generate an image classification output. As another example, machine-learned model(s) 1 can process the image data to generate an image data modification output (e.g., an alteration of the image data, etc.). As another example, machine-learned model(s) 1 can process the image data to generate an encoded image data output (e.g., an encoded and/or compressed representation of the image data, etc.). As another example, machine-learned model(s) 1 can process the image data to generate an upscaled image data output. As another example, machine-learned model(s) 1 can process the image data to generate a prediction output.

In some implementations, the task is a computer vision task. In some cases, input(s) 2 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 2 can be or otherwise represent natural language data. Machine-learned model(s) 1 can process the natural language data to generate an output. As an example, machine-learned model(s) 1 can process the natural language data to generate a language encoding output. As another example, machine-learned model(s) 1 can process the natural language data to generate a latent text embedding output. As another example, machine-learned model(s) 1 can process the natural language data to generate a translation output. As another example, machine-learned model(s) 1 can process the natural language data to generate a classification output. As another example, machine-learned model(s) 1 can process the natural language data to generate a textual segmentation output. As another example, machine-learned model(s) 1 can process the natural language data to generate a semantic intent output. As another example, machine-learned model(s) 1 can process the natural language data to generate an upscaled text or natural language output (e.g., text or natural language data that is higher quality than the input text or natural language, etc.). As another example, machine-learned model(s) 1 can process the natural language data to generate a prediction output (e.g., one or more predicted next portions of natural language content).

In some implementations, input(s) 2 can be or otherwise represent speech data (e.g., data describing spoken natural language, such as audio data, textual data, etc.). Machine-learned model(s) 1 can process the speech data to generate an output. As an example, machine-learned model(s) 1 can process the speech data to generate a speech recognition output. As another example, machine-learned model(s) 1 can process the speech data to generate a speech translation output. As another example, machine-learned model(s) 1 can process the speech data to generate a latent embedding output. As another example, machine-learned model(s) 1 can process the speech data to generate an encoded speech output (e.g., an encoded and/or compressed representation of the speech data, etc.). As another example, machine-learned model(s) 1 can process the speech data to generate an upscaled speech output (e.g., speech data that is higher quality than the input speech data, etc.). As another example, machine-learned model(s) 1 can process the speech data to generate a textual representation output (e.g., a textual representation of the input speech data, etc.). As another example, machine-learned model(s) 1 can process the speech data to generate a prediction output.

In some implementations, input(s) 2 can be or otherwise represent latent encoding data (e.g., a latent space representation of an input, etc.). Machine-learned model(s) 1 can process the latent encoding data to generate an output. As an example, machine-learned model(s) 1 can process the latent encoding data to generate a recognition output. As another example, machine-learned model(s) 1 can process the latent encoding data to generate a reconstruction output. As another example, machine-learned model(s) 1 can process the latent encoding data to generate a search output. As another example, machine-learned model(s) 1 can process the latent encoding data to generate a reclustering output. As another example, machine-learned model(s) 1 can process the latent encoding data to generate a prediction output.

In some implementations, input(s) 2 can be or otherwise represent statistical data. Statistical data can be, represent, or otherwise include data computed and/or calculated from some other data source. Machine-learned model(s) 1 can process the statistical data to generate an output. As an example, machine-learned model(s) 1 can process the statistical data to generate a recognition output. As another example, machine-learned model(s) 1 can process the statistical data to generate a prediction output. As another example, machine-learned model(s) 1 can process the statistical data to generate a classification output. As another example, machine-learned model(s) 1 can process the statistical data to generate a segmentation output. As another example, machine-learned model(s) 1 can process the statistical data to generate a visualization output. As another example, machine-learned model(s) 1 can process the statistical data to generate a diagnostic output.

In some implementations, input(s) 2 can be or otherwise represent sensor data. Machine-learned model(s) 1 can process the sensor data to generate an output. As an example, machine-learned model(s) 1 can process the sensor data to generate a recognition output. As another example, machine-learned model(s) 1 can process the sensor data to generate a prediction output. As another example, machine-learned model(s) 1 can process the sensor data to generate a classification output. As another example, machine-learned model(s) 1 can process the sensor data to generate a segmentation output. As another example, machine-learned model(s) 1 can process the sensor data to generate a visualization output. As another example, machine-learned model(s) 1 can process the sensor data to generate a diagnostic output. As another example, machine-learned model(s) 1 can process the sensor data to generate a detection output.

In some implementations, machine-learned model(s) 1 can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data). In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the task is a generative task, and machine-learned model(s) 1 can be configured to output content generated in view of input(s) 2. For instance, input(s) 2 can be or otherwise represent data of one or more modalities that encodes context for generating additional content.

In some implementations, the task can be a text completion task. Machine-learned model(s) 1 can be configured to process input(s) 2 that represent textual data and to generate output(s) 3 that represent additional textual data that completes a textual sequence that includes input(s) 2. For instance, machine-learned model(s) 1 can be configured to generate output(s) 3 to complete a sentence, paragraph, or portion of text that follows from a portion of text represented by input(s) 2.

In some implementations, the task can be an instruction following task. Machine-learned model(s) 1 can be configured to process input(s) 2 that represent instructions to perform a function and to generate output(s) 3 that advance a goal of satisfying the instruction function (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the instructions (e.g., natural language responses, programming language responses, machine language responses, etc.). One or more output(s) 3 can be iteratively or recursively generated to sequentially process and accomplish steps toward accomplishing the requested functionality. For instance, an initial output can be executed by an external system or be processed by machine-learned model(s) 1 to complete an initial step of performing a function. Multiple steps can be performed, with a final output being obtained that is responsive to the initial instructions.

In some implementations, the task can be a question answering task. Machine-learned model(s) 1 can be configured to process input(s) 2 that represent a question to answer and to generate output(s) 3 that advance a goal of returning an answer to the question (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the question (e.g., natural language responses, programming language responses, machine language responses, etc.). One or more output(s) 3 can be iteratively or recursively generated to sequentially process and accomplish steps toward answering the question. For instance, an initial output can be executed by an external system or be processed by machine-learned model(s) 1 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 2 that represent context regarding a desired portion of image content. The context can include text data, image data, audio data, etc. Machine-learned model(s) 1 can be configured to generate output(s) 3 that represent image data that depicts imagery related to the context. For instance, machine-learned model(s) 1 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 2 that represent context regarding a desired portion of audio content. The context can include text data, image data, audio data, etc. Machine-learned model(s) 1 can be configured to generate output(s) 3 that represent audio data related to the context. For instance, machine-learned model(s) 1 can be configured to generate waveform data in the form of an image (e.g., a spectrogram). Values for channel(s) associated with pixels of the image can be selected based on the context. Machine-learned model(s) 1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 2 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 3 that represent data that aligns with the desired data. For instance, machine-learned model(s) 1 can be configured to generate data values for populating a dataset. Values for the data object(s) can be selected based on the context (e.g., based on a probability determined based on the context).

Example Computing Systems and Devices

Figure 15:
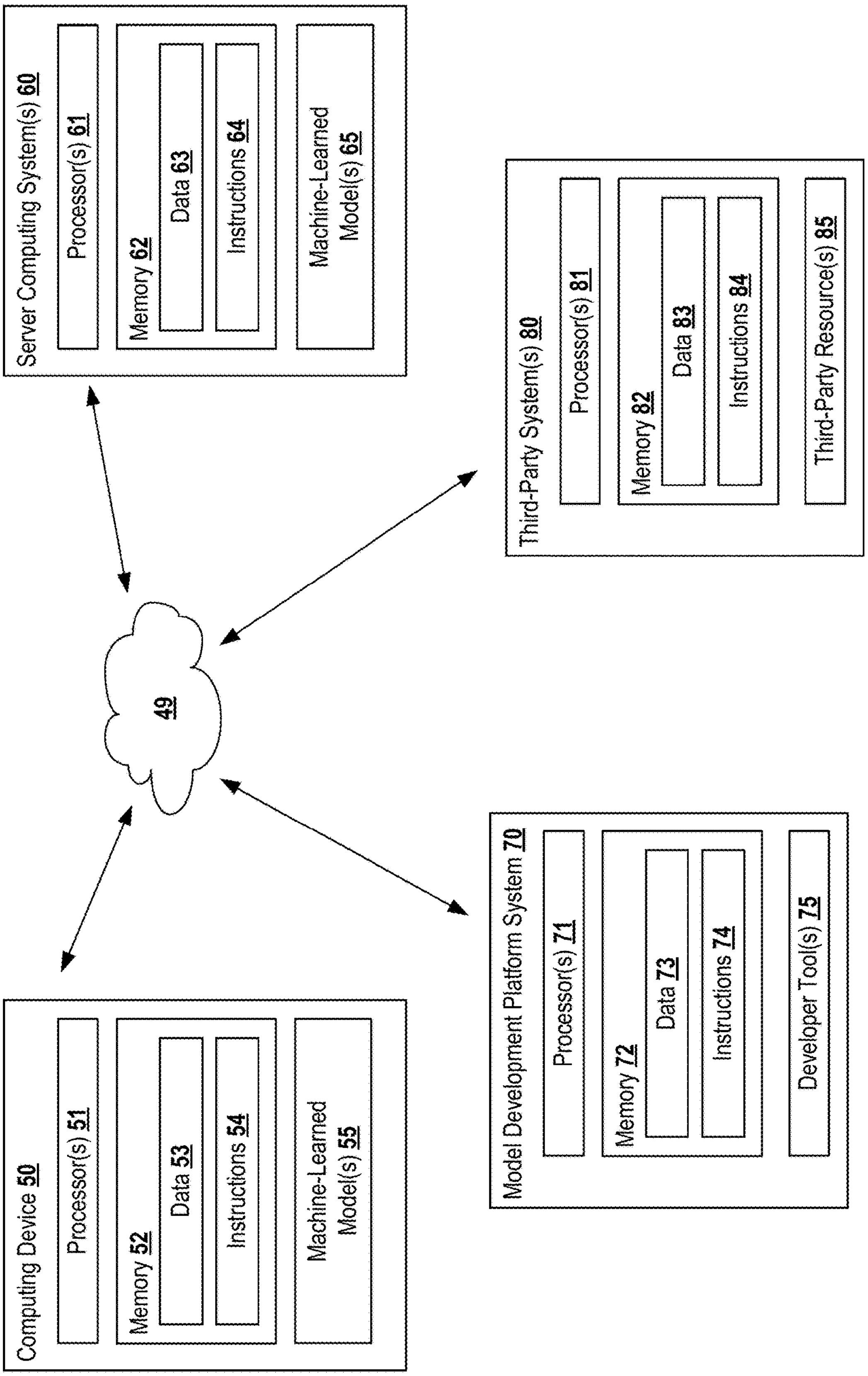
FIG. 15 is a block diagram of an example networked computing system according to example implementations of aspects of the present disclosure.

FIG. 15 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 15 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor(s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 15 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 16:
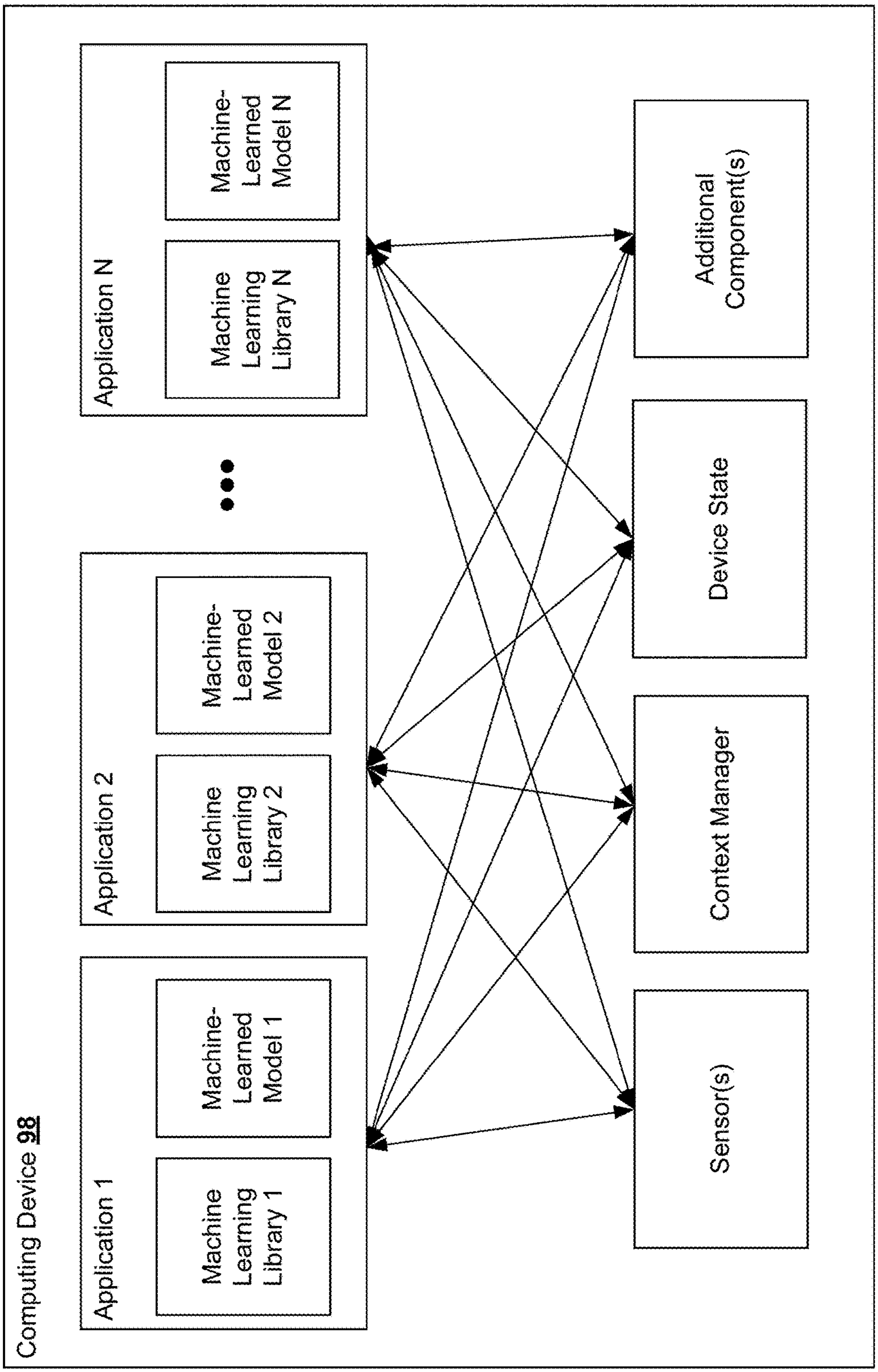
FIG. 16 is a block diagram of an example computing device according to example implementations of aspects of the present disclosure.

FIG. 16 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 16, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 17:
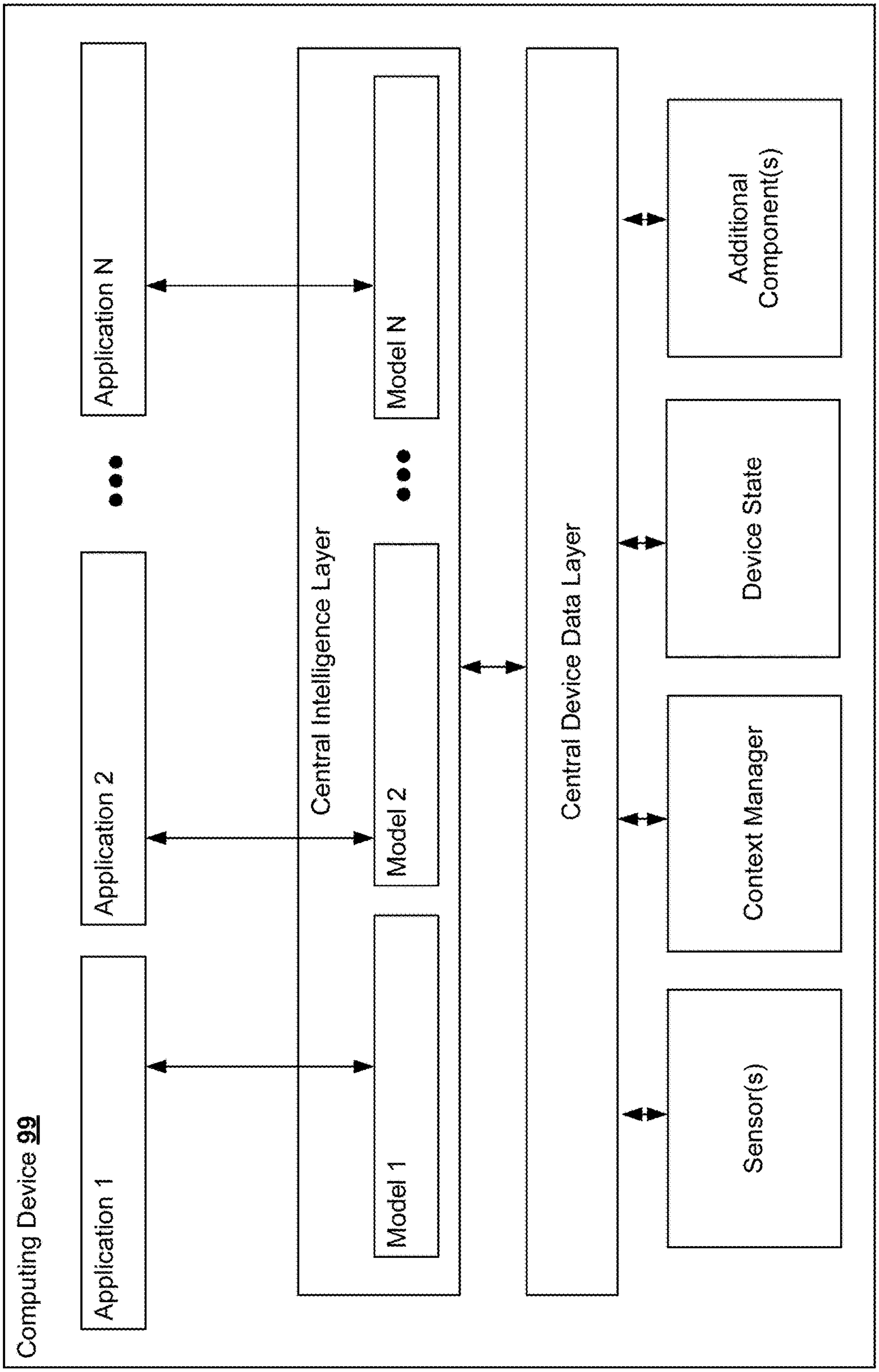
FIG. 17 is a block diagram of an example computing device according to example implementations of aspects of the present disclosure.

FIG. 17 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 17, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 17, the central device data layer can communicate with a number of other components of the computing device, such as, for example, one or more sensors, a context manager, a device state component, or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A method comprising:

obtaining, by a computing system comprising one or more computing devices, a first video, a compressed video, and a decompressed video, the compressed video having been generated from the first video by application of a compression algorithm of a video codec, the decompressed video having been generated from the compressed video by application of a decompression algorithm of the video codec;

training, by the computing system based at least in part on the decompressed video and the first video, a video-specific machine-learned model configured to mitigate compression artifacts of the decompressed video; and transmitting, by the computing system over a communication channel to a destination device, the compressed video and the video-specific machine-learned model.

2. The method of claim 1, wherein a number of multiply-accumulate operations of the video-specific machine-learned model is less than 10,000 multiply-accumulate operations per pixel.

3. The method of claim 2, wherein the video-specific machine-learned model comprises a convolutional neural network having a number of multiply-accumulate operations that is less than 10,000 multiply-accumulate operations per pixel.

4. The method of claim 1, wherein a number of bits of the video-specific machine-learned model is less than 10 percent of a number of bits of the compressed video.

5. The method of claim 1, wherein training the video-specific machine-learned model comprises:

for each of a plurality of training iterations:

providing, by the computing system to the video-specific machine-learned model, data indicative of one or more frames of the decompressed video, wherein the one or more frames are respectively associated with one or more corresponding original frames of the first video;

generating, by the video-specific machine-learned model based on the data indicative of the one or more frames of the decompressed video, one or more training outputs; and updating, by the computing system based on a comparison between the one or more training outputs and the one or more corresponding original frames, the video-specific machine-learned model.

6. The method of claim 5, wherein each frame of the one or more frames comprises an N-dimensional luminance tensor having a first shape and one or more N-dimensional chrominance tensors having a second shape that is smaller than the first shape, wherein N is a positive integer, and wherein training the video-specific machine-learned model further comprises:

transforming, by the computing system, the luminance tensor into a plurality of smaller luminance tensors; and providing, by the computing system to the video-specific machine-learned model, each frame of the one or more frames as an (N+1)-dimensional tensor comprising the plurality of smaller luminance tensors and the one or more chrominance tensors concatenated along the (N+1)th dimension.

7. The method of claim 6, wherein the smaller luminance tensors have the second shape.

8. The method of claim 6, wherein the (N+1)-dimensional tensor further comprises one or more positional embedding tensors having the second shape.

9. The method of claim 5, wherein updating the video-specific machine-learned model comprises updating based on a loss function indicative of a weighted combination of a plurality of signal-to-noise ratios associated with a plurality of channels of the one or more frames, wherein a weight associated with a luminance channel of the plurality of channels is greater than a weight associated with a first chrominance channel of the plurality of channels.

10. The method of claim 5, wherein the one or more frames comprise at least one of:

a plurality of temporally related frames, wherein the video-specific machine-learned model is configured to perform temporal convolutions; and a plurality of randomly sampled frames, wherein the video-specific machine-learned model does not perform temporal convolutions.

11. The method of claim 1, wherein training the video-specific machine-learned model comprises:

quantizing, by the computing system, the video-specific machine-learned model.

12. The method of claim 11, wherein the video-specific machine-learned model comprises a sequence of layers comprising an input layer, one or more intermediate layers, and an output layer, and wherein training the video-specific machine-learned model comprises:

quantizing one or both of the input layer and the output layer according to a first quantization step size; and quantizing at least one of the one or more intermediate layers according to a second quantization step size that is smaller than the first quantization step size.

13. The method of claim 11, wherein quantizing the video-specific machine-learned model comprises:

for each of a plurality of respective candidate quantization step sizes:

quantizing, by the computing system, one or more parameters of the video-specific machine-learned model according to the respective candidate quantization step size to generate a candidate quantized machine-learned model;

generating, by the candidate quantized machine-learned model based on the compressed video, a reconstructed video; and determining, by the computing system, a metric of video quality of the reconstructed video; and selecting, by the computing system based on a rate-distortion tradeoff, a quantization step size of the plurality of respective candidate quantization step sizes.

14. The method of claim 1, comprising:

obtaining, by the computing system, a plurality of decompressed video segments that have been generated by segmenting, compressing, and decompressing a second video;

training, by the computing system based on the plurality of decompressed video segments, a plurality of respective segment-specific machine-learned models, wherein each respective segment-specific machine-learned model of the plurality of respective segment-specific machine-learned models is configured to mitigate compression artifacts of a respective decompressed video segment of the plurality of decompressed video segments; and transmitting, by the computing system over a communication channel to a destination device, the plurality of respective segment-specific machine-learned models and compressed video data associated with the second video.

15. The method of claim 14, wherein obtaining the plurality of decompressed video segments comprises segmenting based on one or more of:

one or more detected boundaries between scenes of the second video;

one or more detected boundaries between shots of the second video; and one or more metrics of change between frames or groups of frames of the second video.

16. The method of claim 1, wherein transmitting the compressed video and the video-specific machine-learned model comprises:

packaging, by the computing system, the compressed video and the video-specific machine-learned model into a combined file package; and transmitting, by the computing system, the combined file package to the destination device.

17. A computing system comprising one or more processors and one or more non-transitory computer-readable media storing instructions that are executable by one or more processors to cause the computing system to perform operations, the operations comprising:

transmitting, over a communication channel to a destination device:

a compressed video that has been generated by compressing a first video; and a video-specific machine-learned model that has been trained by:

providing, to the video-specific machine-learned model at each of a plurality of training iterations, data indicative of one or more frames of a decompressed video that has been generated by decompressing the compressed video, wherein the one or more frames are respectively associated with one or more corresponding original frames of the first video;

receiving, from the video-specific machine-learned model at each of the plurality of training iterations, one or more training outputs generated based on the data indicative of the one or more frames of the decompressed video; and updating, at each of the plurality of training iterations, based on a comparison between the one or more training outputs and the one or more corresponding original frames, the video-specific machine-learned model.

18. One or more non-transitory computer-readable media storing instructions that are executable by one or more processors to cause a computing system to perform operations, the operations comprising:

receiving, over a communication channel, a first compressed video and a video-specific machine-learned model associated with the first compressed video;

decompressing the first compressed video using a video codec to generate a first decompressed video;

providing, to the video-specific machine-learned model, one or more first frames of the first decompressed video;

receiving, from the video-specific machine-learned model, one or more second frames generated based on the one or more first frames; and displaying, to a user, the one or more second frames.

19. The one or more non-transitory computer-readable media of claim 18, wherein the video-specific machine-learned model comprises a convolutional neural network having a number of multiply-accumulate operations that is less than 5,000 multiply-accumulate operations per pixel.

20. The one or more non-transitory computer-readable media of claim 18, wherein the video-specific machine-learned model comprises one or more parameters that have been quantized according to one or more quantization step sizes.

* * * * *